US012730868B2

(12) United States Patent
Takahashi

(10) Patent No.: US 12,730,868 B2
(45) Date of Patent: Sep. 8, 2026

(54) PROCESSING SYSTEM, INFORMATION PROCESSING APPARATUS, NON-TRANSITORY COMPUTER-READABLE STORAGE MEDIUM STORING CONTROL PROGRAM, AND IMAGE PROCESSING APPARATUS

(71) Applicant: SEIKO EPSON CORPORATION, Tokyo (JP)

(72) Inventor: Daisuke Takahashi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 417 days.

(21) Appl. No.: 18/157,398

(22) Filed: Jan. 20, 2023

(65) Prior Publication Data

US 2023/0237136 A1 Jul. 27, 2023

(30) Foreign Application Priority Data

Jan. 21, 2022 (JP) ................................. 2022-007673

(51) Int. Cl.
*G06F 21/32* (2013.01)
*G06V 40/16* (2022.01)
*G06V 40/50* (2022.01)

(52) U.S. Cl.
CPC ............ *G06F 21/32* (2013.01); *G06V 40/172* (2022.01); *G06V 40/50* (2022.01)

(58) Field of Classification Search
CPC ...... G06F 21/32; G06V 40/172; G06V 40/50; G06V 40/197; B41J 3/445; H04N 1/00408; H04N 1/0048; H04N 1/442
See application file for complete search history.

(56) References Cited

U.S. PATENT DOCUMENTS 8,559,684 B1 * 10/2013 Nechyba .............. G06V 10/761 382/118
9,298,976 B2 * 3/2016 Je ......................... G06V 40/172
10,162,955 B2 * 12/2018 Lee ...................... G06V 40/166
(Continued)

FOREIGN PATENT DOCUMENTS

JP 2018015912 A 2/2018
JP 2019168929 A 10/2019

OTHER PUBLICATIONS

Office Action for JP Patent Application No. 2022007673, issued on Aug. 5, 2025, 10 pages.

*Primary Examiner* — Wesley J Tucker
(74) *Attorney, Agent, or Firm* — CHIP LAW GROUP

(57) ABSTRACT

A processing system including an image processing apparatus provided with a display section, the processing system includes, from a face authentication section that performs face authentication processing based on a coincidence rate between a face image corresponding to registered face data and a captured image of a face of a user, an acquisition section that acquires the coincidence rate; and when the user is authenticated by the face authentication processing, a processing section that displays an execution instruction screen for receiving an execution instruction of image processing to be executed by the image processing apparatus on the display section. When the user is not authenticated by the face authentication processing, the processing section displays a different screen in accordance with a level of the coincidence rate on the display section.

8 Claims, 11 Drawing Sheets

(56) References Cited

U.S. PATENT DOCUMENTS

| | | | | |
|---|---|---|---|---|
| 10,303,866 | B1 * | 5/2019 | Van Os | G06V 40/171 |
| 11,068,702 | B1 * | 7/2021 | Steinberg | G06V 40/168 |
| 11,163,981 | B2 * | 11/2021 | Susskind | G06V 40/169 |
| 11,991,180 | B2 * | 5/2024 | Chae | H04L 63/083 |
| 12,154,403 | B2 * | 11/2024 | Voss | G07C 9/25 |
| 2011/0115877 | A1 * | 5/2011 | Kang | H04N 21/4788 382/118 |
| 2015/0033304 | A1 * | 1/2015 | Fujiwara | G06V 40/171 726/6 |
| 2017/0140212 | A1 * | 5/2017 | Lo | G06V 40/171 |
| 2018/0349590 | A1 * | 12/2018 | Huang | G06F 18/24143 |
| 2019/0042866 | A1 * | 2/2019 | Mostafa | G06V 40/171 |
| 2019/0102528 | A1 * | 4/2019 | Beacham | G06V 10/82 |
| 2019/0318160 | A1 * | 10/2019 | Nozue | G06T 7/00 |
| 2020/0089937 | A1 * | 3/2020 | Tseng | G06V 40/172 |
| 2020/0364479 | A1 * | 11/2020 | Tseng | G06V 10/761 |
| 2021/0056289 | A1 * | 2/2021 | Kochi | G06V 40/168 |
| 2021/0097261 | A1 * | 4/2021 | Kapinos | G06N 3/04 |

* cited by examiner

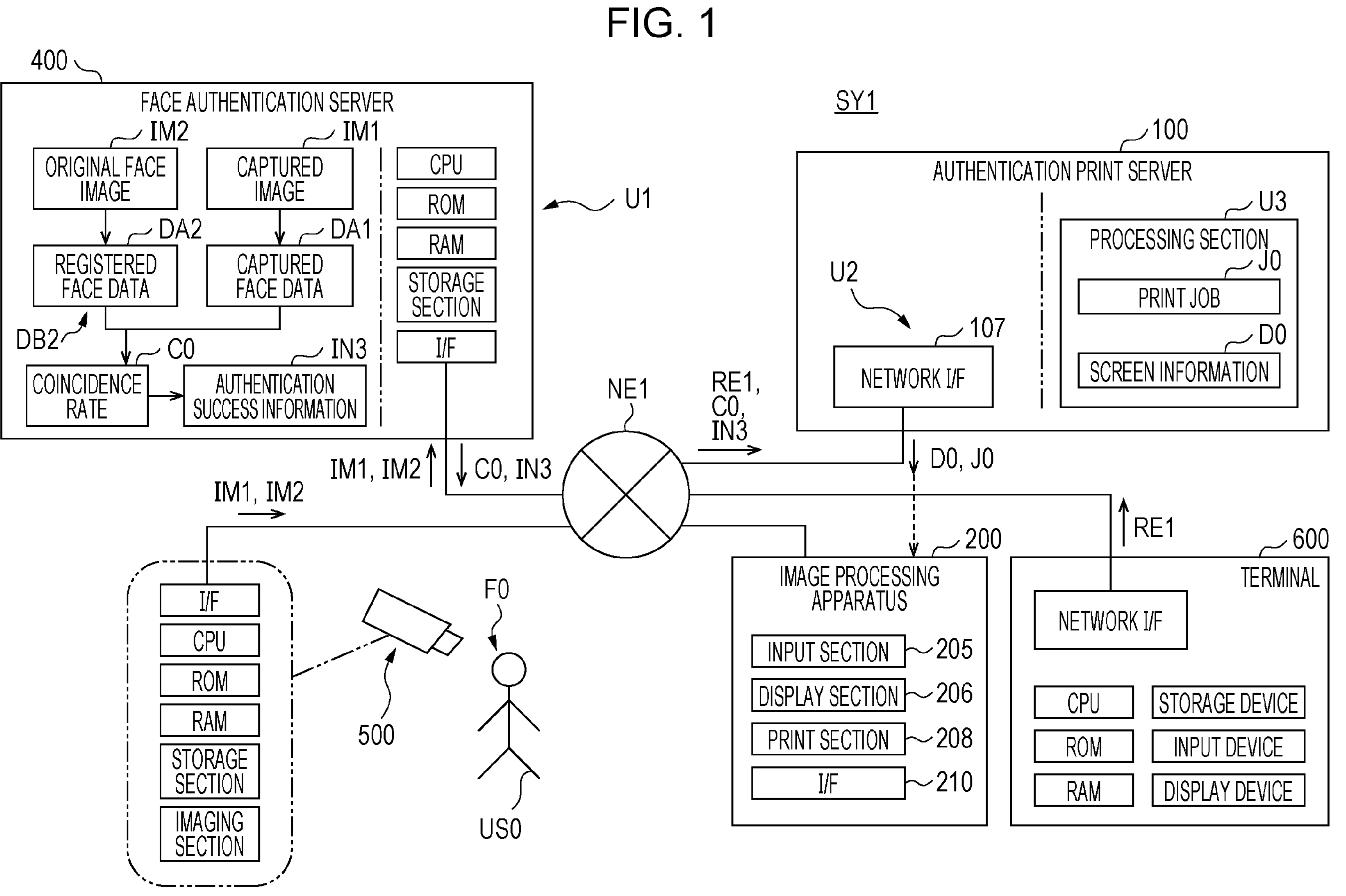
FIG. 1
400
FACE AUTHENTICATION SERVER
IM2
ORIGINAL FACE IMAGE
IM1
CAPTURED IMAGE
DA2
REGISTERED FACE DATA
DA1
CAPTURED FACE DATA
DB2
C0
COINCIDENCE RATE
IN3
AUTHENTICATION SUCCESS INFORMATION
CPU
ROM
RAM
STORAGE SECTION
I/F
U1
SY1
100
AUTHENTICATION PRINT SERVER
U3
PROCESSING SECTION
J0
PRINT JOB
D0
SCREEN INFORMATION
U2
107
NETWORK I/F
NE1
RE1, C0, IN3
IM1, IM2
C0, IN3
D0, J0
IM1, IM2
RE1
200
IMAGE PROCESSING APPARATUS
INPUT SECTION
205
DISPLAY SECTION
206
PRINT SECTION
208
I/F
210
600
TERMINAL
NETWORK I/F
CPU
ROM
RAM
STORAGE DEVICE
INPUT DEVICE
DISPLAY DEVICE
I/F
CPU
ROM
RAM
STORAGE SECTION
IMAGING SECTION
500
F0
US0

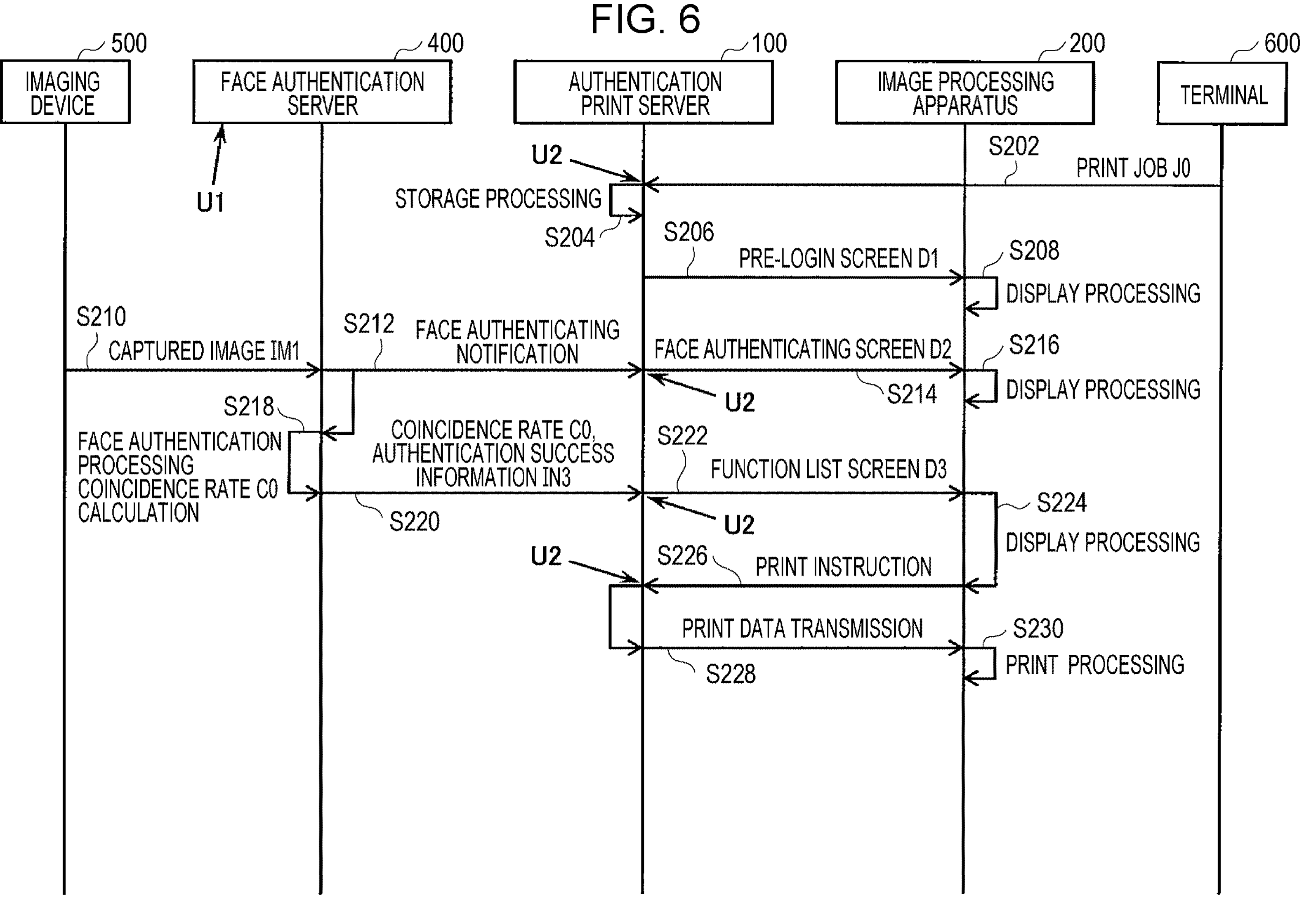
FIG. 6
500
IMAGING DEVICE
400
FACE AUTHENTICATION SERVER
100
AUTHENTICATION PRINT SERVER
200
IMAGE PROCESSING APPARATUS
600
TERMINAL
U1
U2
S202
PRINT JOB J0
STORAGE PROCESSING
S204
S206
PRE-LOGIN SCREEN D1
S208
DISPLAY PROCESSING
S210
CAPTURED IMAGE IM1
S212
FACE AUTHENTICATING NOTIFICATION
FACE AUTHENTICATING SCREEN D2
S214
S216
DISPLAY PROCESSING
S218
FACE AUTHENTICATION PROCESSING
COINCIDENCE RATE C0 CALCULATION
COINCIDENCE RATE C0, AUTHENTICATION SUCCESS INFORMATION IN3
S220
S222
FUNCTION LIST SCREEN D3
S224
DISPLAY PROCESSING
S226
PRINT INSTRUCTION
PRINT DATA TRANSMISSION
S228
S230
PRINT PROCESSING

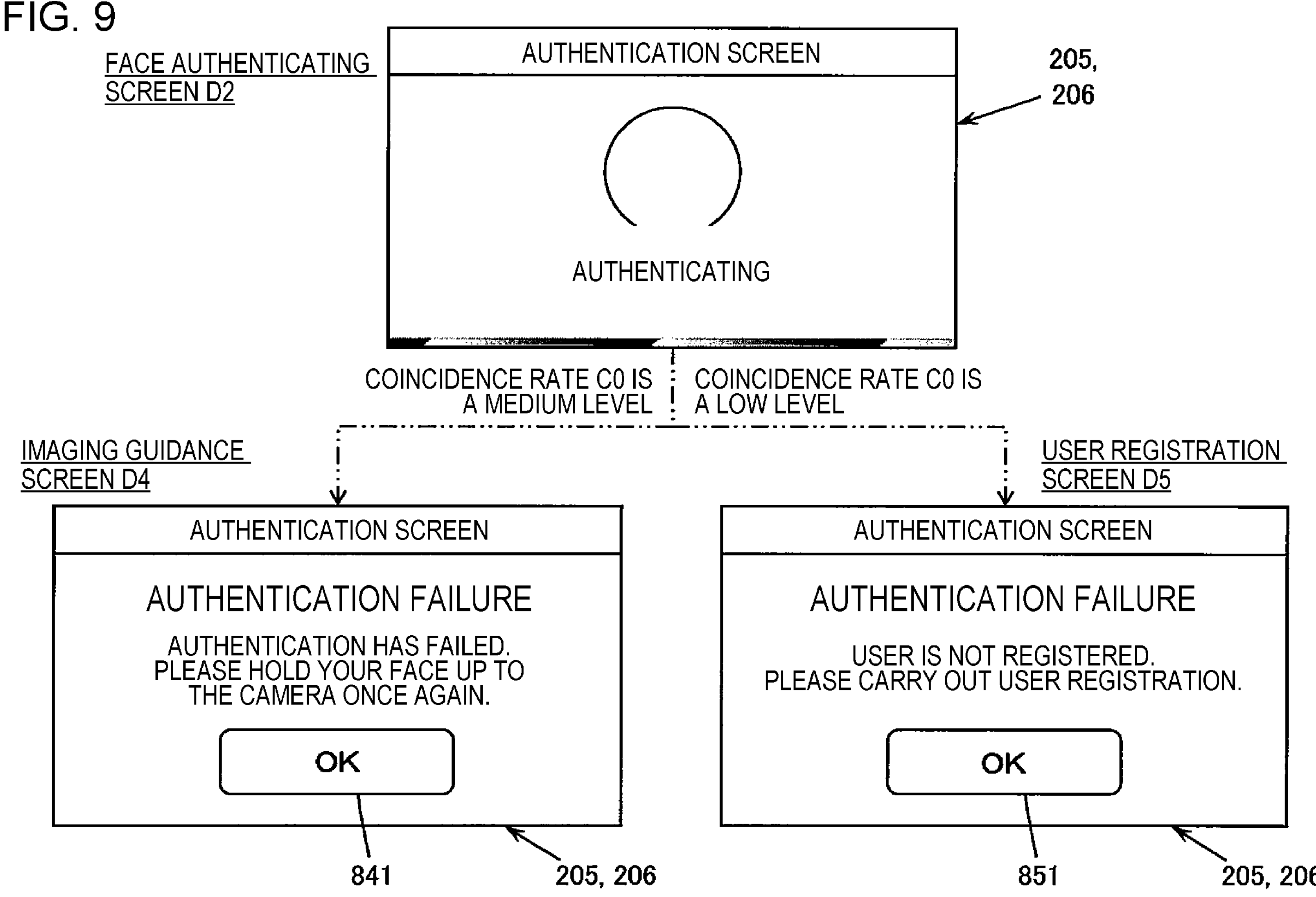
FIG. 9
FACE AUTHENTICATING SCREEN D2
AUTHENTICATION SCREEN
AUTHENTICATING
205, 206
COINCIDENCE RATE C0 IS A MEDIUM LEVEL
COINCIDENCE RATE C0 IS A LOW LEVEL
IMAGING GUIDANCE SCREEN D4
AUTHENTICATION SCREEN
AUTHENTICATION FAILURE
AUTHENTICATION HAS FAILED.
PLEASE HOLD YOUR FACE UP TO THE CAMERA ONCE AGAIN.
OK
841
205, 206
USER REGISTRATION SCREEN D5
AUTHENTICATION SCREEN
AUTHENTICATION FAILURE
USER IS NOT REGISTERED.
PLEASE CARRY OUT USER REGISTRATION.
OK
851
205, 206

FIG. 11

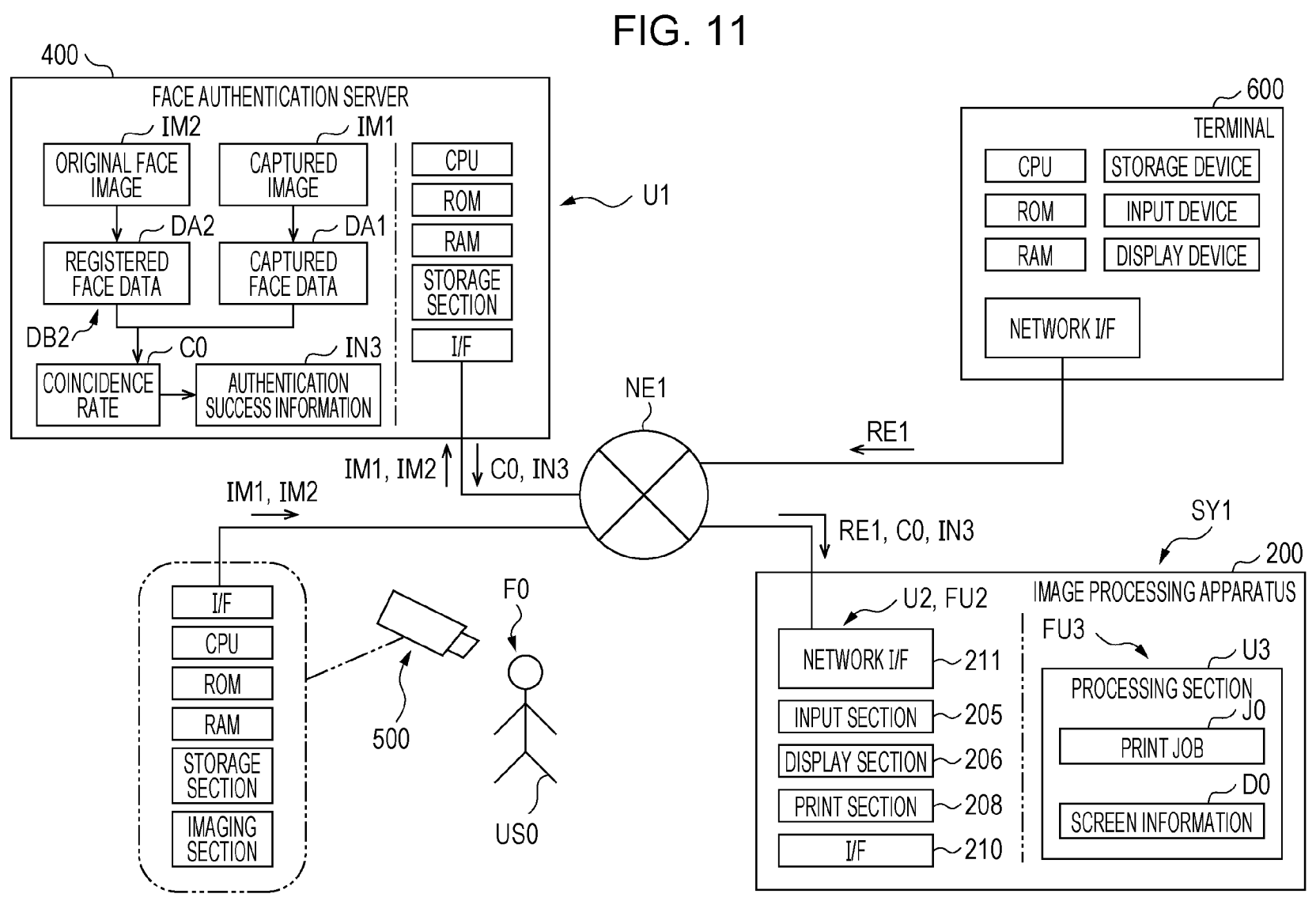

SY1
600
TERMINAL
CPU
ROM
RAM
STORAGE DEVICE
INPUT DEVICE
DISPLAY DEVICE
NETWORK I/F
RE1
200
IMAGE PROCESSING APPARATUS
U3
PROCESSING SECTION
J0
PRINT JOB
D0
SCREEN INFORMATION
FU3
U2, FU2
NETWORK I/F
211
INPUT SECTION
205
DISPLAY SECTION
206
PRINT SECTION
208
I/F
210
RE1, C0, IN3
NE1
U1
400
FACE AUTHENTICATION SERVER
CPU
ROM
RAM
STORAGE SECTION
I/F
IM2
ORIGINAL FACE IMAGE
DA2
REGISTERED FACE DATA
DB2
IM1
CAPTURED IMAGE
DA1
CAPTURED FACE DATA
C0
COINCIDENCE RATE
IN3
AUTHENTICATION SUCCESS INFORMATION
C0, IN3
IM1, IM2
IM1, IM2
I/F
CPU
ROM
RAM
STORAGE SECTION
IMAGING SECTION
500
F0
US0

PROCESSING SYSTEM, INFORMATION PROCESSING APPARATUS, NON-TRANSITORY COMPUTER-READABLE STORAGE MEDIUM STORING CONTROL PROGRAM, AND IMAGE PROCESSING APPARATUS

The present application is based on, and claims priority from JP Application Serial Number 2022-007673, filed Jan. 21, 2022, the disclosure of which is hereby incorporated by reference herein in its entirety.

BACKGROUND

1. Technical Field

The present disclosure relates to a processing system including an image processing apparatus provided with a display section, an information processing apparatus, a non-transitory computer-readable storage medium storing a control program, and an image processing apparatus.

2. Related Art

An image processing apparatus, such as a complex machine, or the like sometimes performs face authentication before performing image processing, for example, printing, reading a document, or the like. An image processing apparatus disclosed in JP-A-2018-15912 captures an image of the face of a user who performs printing, extracts respective feature points of the captured face image and a face image in a print information management table, and determines whether or not the user is the same person. When the user is determined as a different person, the image processing apparatus suspends the processing, whereas when the user is determined as the same person, the image processing apparatus permits to print a file related to the print user.

When face authentication has failed, a user sometimes does not know why the face authentication has failed and how to handle the situation.

SUMMARY

According to an aspect of the present disclosure, there is provided a processing system including an image processing apparatus provided with a display section, the processing system including: from a face authentication section that performs face authentication processing based on a coincidence rate between a face image corresponding to registered face data and a captured image of a face of a user, an acquisition section that acquires the coincidence rate; and when the user is authenticated by the face authentication processing, a processing section that displays an execution instruction screen for receiving an execution instruction of image processing to be executed by the image processing apparatus on the display section. When the user is not authenticated by the face authentication processing, the processing section displays a different screen in accordance with a level of the coincidence rate on the display section.

According to another aspect of the present disclosure, there is provided an information processing apparatus connected to an image processing apparatus including a display section, the information processing apparatus including: from a face authentication section that performs face authentication processing based on a coincidence rate between a face image corresponding to registered face data and a captured image of a face of a user, an acquisition section that acquires the coincidence rate; and when the user is authenticated by the face authentication processing, a processing section that displays an execution instruction screen for receiving an execution instruction of image processing to be executed by the image processing apparatus on the display section. When the user is not authenticated by the face authentication processing, the processing section displays a different screen in accordance with a level of the coincidence rate on the display section.

According to still another aspect of the present disclosure, there is provided a non-transitory computer-readable storage medium storing a control program for controlling an image processing apparatus including a display section, the control program for causing a computer to perform processing including: from a face authentication section that performs face authentication processing based on a coincidence rate between a face image corresponding to registered face data and a captured image of a face of a user, an acquisition function that acquires the coincidence rate; and when the user is authenticated by the face authentication processing, a processing function that displays an execution instruction screen for receiving an execution instruction of image processing to be executed by the image processing apparatus on the display section. When the user is not authenticated by the face authentication processing, the processing function displays a different screen in accordance with a level of the coincidence rate on the display section.

According to still another aspect of the present disclosure, there is provided an image processing apparatus including: a display section; from a face authentication section that performs face authentication processing based on a coincidence rate between a face image corresponding to registered face data and a captured image of a face of a user, an acquisition section that acquires the coincidence rate; and when the user is authenticated by the face authentication processing, a processing section that displays an execution instruction screen for receiving an execution instruction of image processing on the display section. When the user is not authenticated by the face authentication processing, the processing section displays a different screen in accordance with a level of the coincidence rate on the display section.

BRIEF DESCRIPTION OF THE DRAWINGS

FIG. 1 is a block diagram schematically illustrating an example of the configuration of a system including a processing system.

FIG. 6 is a diagram schematically illustrating an example of the flow of the processing performed by the processing system when a user is authenticated by face authentication processing.

FIG. 9 is a diagram schematically illustrating an example of screens displayed on the display section in accordance with the level of coincidence rate when a user is not authenticated by the face authentication processing.

FIG. 11 is a block diagram schematically illustrating another example of the configuration of a system including the processing system.

DESCRIPTION OF EXEMPLARY EMBODIMENTS

Figure 2:
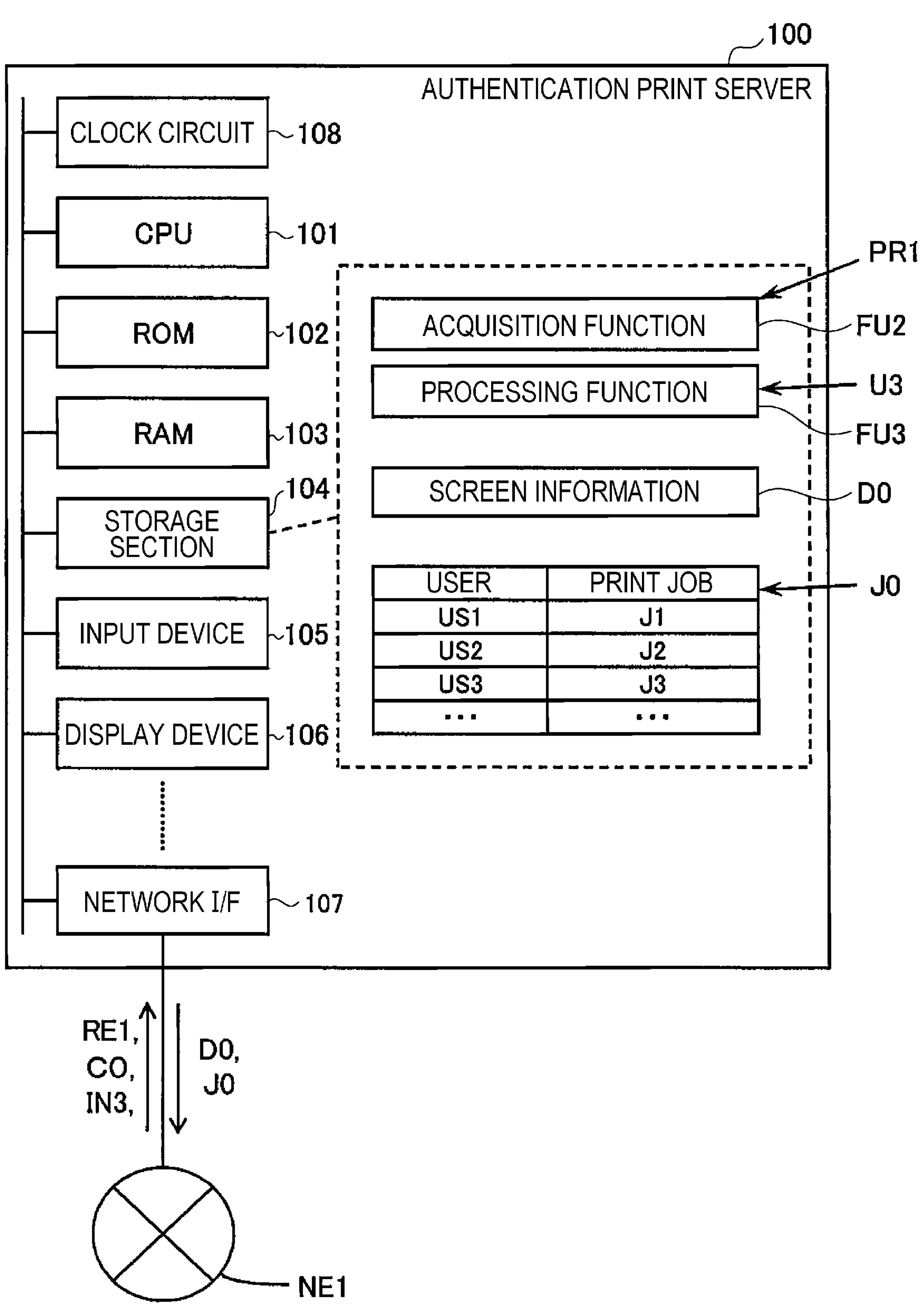
FIG. 2 is a block diagram schematically illustrating an example of the configuration of an information processing apparatus.

In the following, a description will be given of embodiments of the present disclosure. Of course, the following embodiments are only examples of the present disclosure, and all the features described in the embodiments are not necessarily mandatory for solving means of the disclosure.

1. OVERVIEW OF TECHNOLOGY INCLUDED IN THE PRESENT DISCLOSURE

First, a description will be given of the overview of the technology included in the present disclosure with reference to the examples illustrated in FIGS. 1 to 11. In this regard, the diagrams in the application concerned are diagrams schematically illustrating examples, the enlargement ratios in individual directions illustrated in these diagrams may be different, and thus the individual diagrams may not be consistent. Of course, each component in the present technology is not limited to a specific example denoted by a sign. In "Overview of Technology included in the Present Disclosure", the words in parentheses refer to the supplementary explanation of the immediately preceding word.

First Aspect

As exemplified in FIG. 1 to FIG. 11, a processing system SY1 according to an aspect of the present technology includes an image processing apparatus 200 provided with a display section 206, and includes an acquisition section U2 and a processing section U3. From a face authentication section U1 that performs face authentication processing based on the coincidence rate C0 between a face image (for example, a registered face image IM3 illustrated in FIG. 5) corresponding to registered face data (for example, registered face data DA2) and a captured image IM1 of a face FO of a user US0, the acquisition section U2 acquires the coincidence rate C0. When the user US0 is authenticated by the face authentication processing, the processing section U3 displays an execution instruction screen (for example, a function list screen D3 illustrated in FIG. 7) that receives the execution instruction of image processing to be executed by the image processing apparatus 200 on the display section 206. When the user US0 is not authenticated by the face authentication processing, the processing section U3 displays a different screen (for example, an imaging guidance screen D4 or a user registration screen D5 illustrated in FIG. 9) in accordance with the level of the coincidence rate C0 on the display section 206.

By the above, when the user US0 is not authenticated by the face authentication processing, not a uniform screen but a different screen (D4 or D5) is displayed in accordance with the level of the coincidence rate C0 between the registered face image IM3 and the captured image IM1 on the display section 206 of the image processing apparatus 200. The user US0 is able to understand the level of the coincidence rate C0 between the registered face image IM3 and the captured image IM1 by viewing the screen of the display section 206 (D4 or D5). According to the first aspect, it is possible to provide the processing system SY1 that improves the convenience of the user US0 who uses the image processing apparatus 200.

Here, the image processing apparatus 200 includes a complex machine, a printer, a scanner, or the like. The complex machine refers to the image processing apparatus 200 having two functions or more out of a plurality of functions including a print function, a read function of a document, a copy function, a facsimile function, and the like. The image processing includes the processing such as printing, reading a document, copying a document, facsimile communication, and the like. The registered face data (DA2) may be data indicating feature parts extracted from a face image (for example, original face image IM2) for use in registering a face data (DA2) or the above-described face image (IM2) itself. The processing system SY1 may include a face authentication section U1. The face authentication section U1 may generate authentication success information IN3 indicating that the user US0 has been authenticated by the face authentication processing, and the acquisition section U2 may acquire the authentication success information IN3. When the acquisition section U2 acquires the authentication success information IN3, the processing section U3 may display the execution instruction screen (D3) on the display section 206. Also, whether or not the user US0 has been authenticated from the coincidence rate C0 is known by the face authentication processing, and thus when the processing section U3 confirms that the face authentication has been successful based on the coincidence rate C0 acquired by the acquisition section U2, the processing section U3 may display the execution instruction screen (D3) on the display section 206. A level of the coincidence rate C0 refers to an index indicating the height of a stage when the coincidence rate C0 is divided into a plurality of stages. In this regard, the additional remark described above is also applied to the following aspects.

Second Aspect

Figure 8:
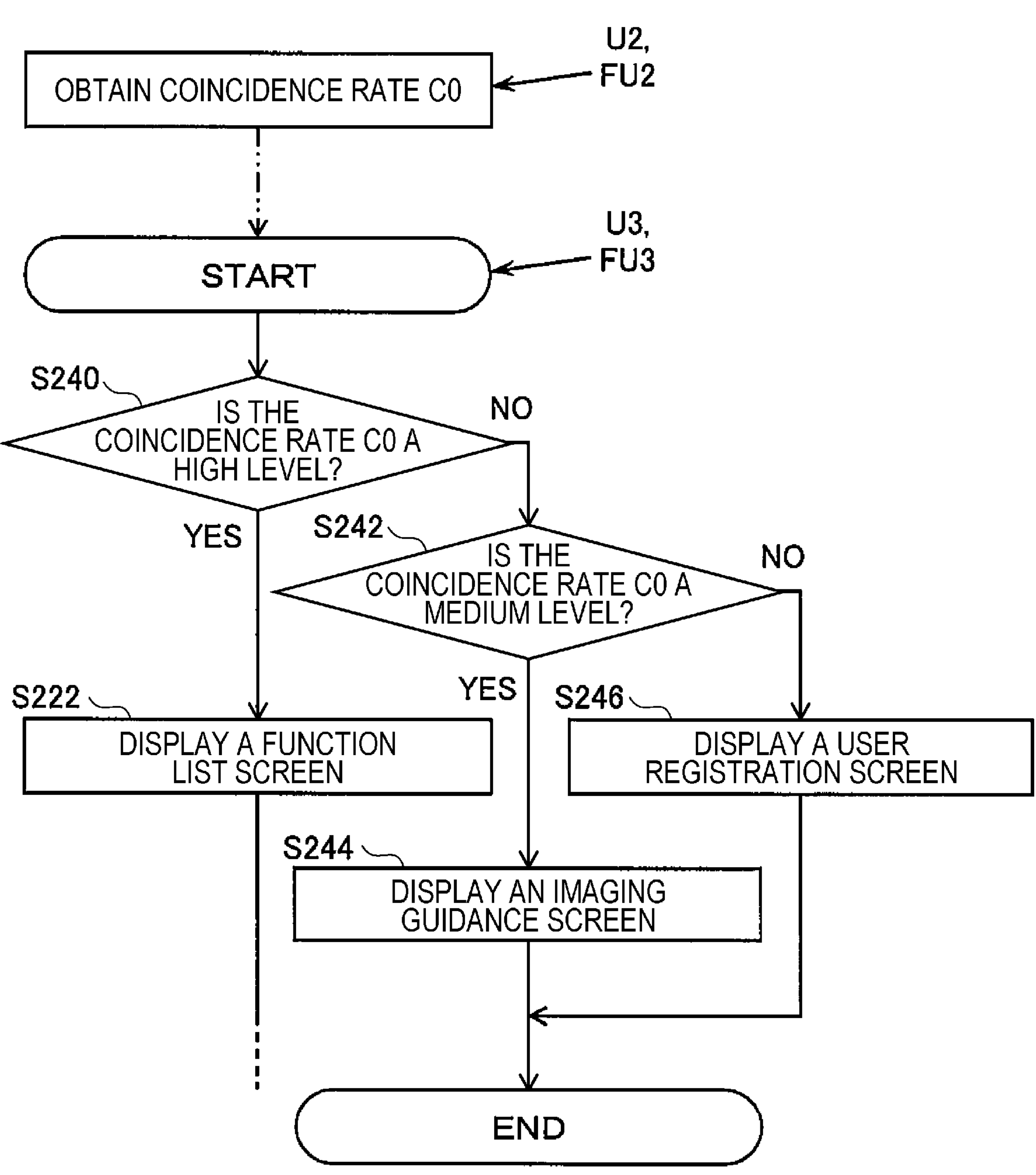
FIG. 8 is a flowchart schematically illustrating an example of the processing performed by a processing section.
Figure 10:
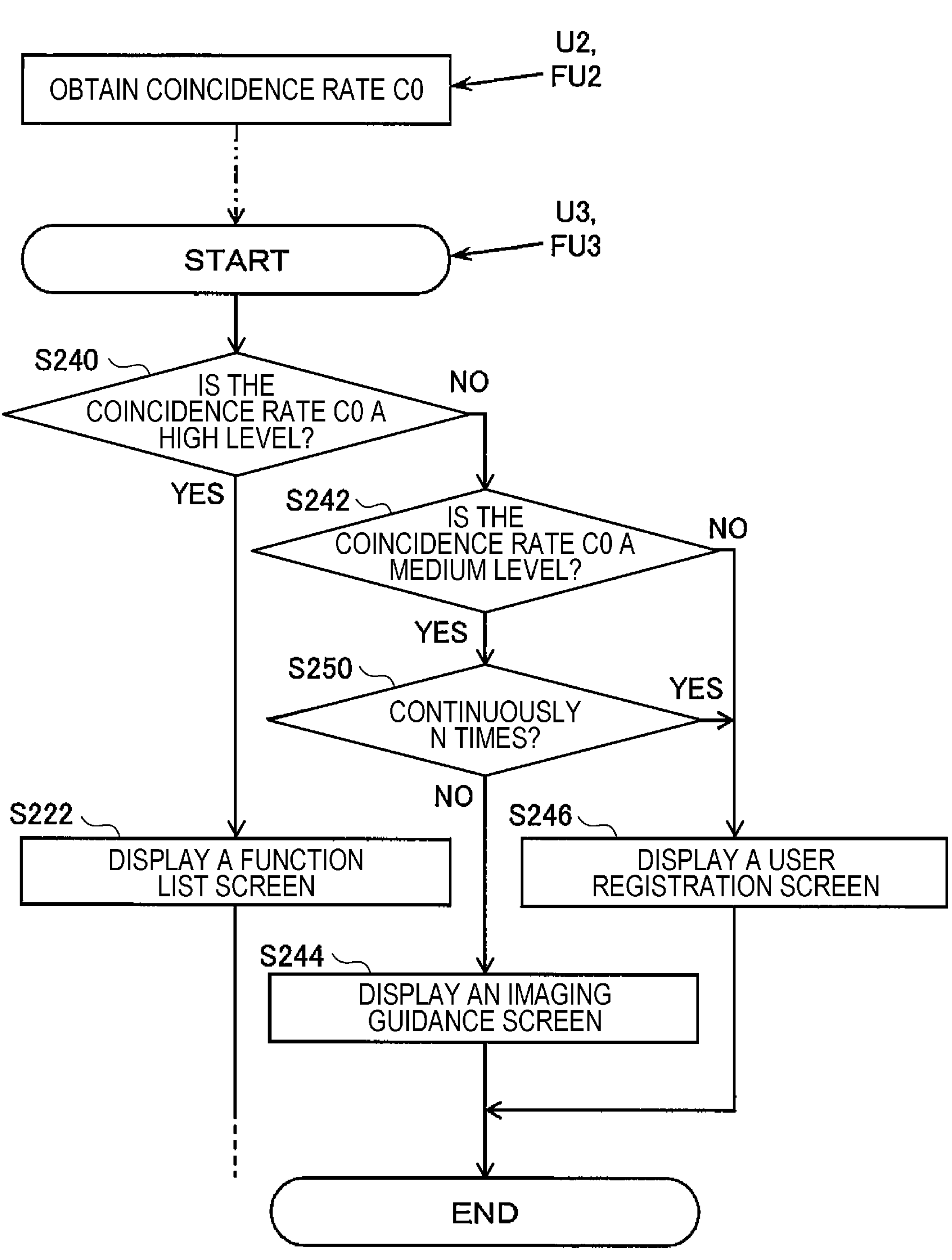
FIG. 10 is a flowchart schematically illustrating another example of the processing performed by the processing section.

As exemplified in FIGS. 8 to 10, the level of the coincidence rate C0 when the user US0 is not authenticated by the face authentication processing may include a first level (for example, low level), and a second level (for example, medium level) higher than the first level. When the coincidence rate C0 acquired by the acquisition section U2 is the first level, the processing section U3 may display the user registration screen D5 prompting generation of the face data (DA2) to be associated with the user identification information UID identifying the user US0 on the display section 206. When the user US0 is not authenticated by the face authentication processing and in a case in which the level of the coincidence rate C0 between the registered face image IM3 and the captured image IM1 is the first level lower than the second level, the user registration screen D5 is displayed on the display section 206 of the image processing apparatus 200. It is possible for the user US0 to understand that the user US0 ought to perform user registration by viewing the user registration screen D5. According to the second aspect, it is possible to further improve the convenience of the user US0 who uses the image processing apparatus 200. Here, the level of the coincidence rate when a user is not authenticated by the face authentication processing may include a third level different from the first level and the second level. In this regard, "first", "second", and the like in the application concerned are the terms for identifying individual elements included in a plurality of elements having a similarity, and do not mean the orders. Also, the level of the coincidence rate when the user is authenticated by the face authentication processing may include a plurality of levels. These additional remarks are also applied to the following aspects.

Third Aspect

As exemplified in FIG. 8 and FIG. 9, when the coincidence rate C0 acquired by the acquisition section U2 is the second level, the processing section U3 may display the imaging guidance screen D4 prompting imaging for performing the face authentication processing again on the display section 206. When the user US0 is not authenticated by the face authentication processing, and in a case in which the level of the coincidence rate C0 is the second level higher than the first level, the imaging guidance screen D4 is displayed on the display section 206 of the image processing apparatus 200. It is possible for the user US0 to understand that the user US0 ought to perform an operation to capture the image of the face FO again by viewing the imaging guidance screen D4. According to the third aspect, it is possible to further improve the convenience of the user US0 who uses the image processing apparatus 200.

Fourth Aspect

As illustrated in FIG. 10, when the coincidence rate C0 of the user US0 acquired by the acquisition section U2 is the second level continuously for N times where N is an integer of two or more, the processing section U3 may display the user registration screen D5 prompting generation of the face data (DA2) to be associated with the user identification information UID identifying the user US0 on the display section 206. When the coincidence rate C0 acquired by the acquisition section U2 is the second level, and the user registration screen D5 is not displayed, the processing section U3 may display the imaging guidance screen D4 prompting imaging for performing the face authentication processing again on the display section 206. Even when the level of the coincidence rate C0 is the second level higher than the first level, in a case in which the coincidence rate C0 calculated by the face authentication processing is repeatedly the second level, there is little chance of success in the face authentication. In this case, the user registration screen D5 is displayed on the display section 206 of the image processing apparatus 200, and thus it is possible for the user US0 to understand that the user US0 ought to perform user registration by viewing the user registration screen D5. According to the fourth aspect, it is possible to further improve the convenience of the user US0 who uses the image processing apparatus 200.

Fifth Aspect

As exemplified in FIG. 1, the processing section U3 may display a screen on the display section 206 via the network NE1. According to the fifth aspect, it is possible to perform advanced processing by using the information processing apparatus (for example, the authentication print server 100) connected to the image processing apparatus 200 via a network, and thus to provide a suitable example of the processing system SY1.

Sixth Aspect

As exemplified in FIG. 11, the acquisition section U2 and the processing section U3 may be included in the image processing apparatus 200. According to the sixth aspect, it is possible to provide the processing system SY1 that does not require a server for managing the image processing apparatus Seventh Aspect Incidentally, as exemplified in FIG. 1 and FIG. 2, an information processing apparatus (100) according to an aspect of the present technology is the information processing apparatus (100) connected to the image processing apparatus 200 including the display section 206, and includes the acquisition section U2 and the processing section U3. The acquisition section U2 acquires the coincidence rate C0 from the face authentication section U1 that performs face authentication processing based on the coincidence rate C0 between the face image (IM3) corresponding to the registered face data (DA2) and the captured image IM1 of the face FO of the user US0. When the user US0 is authenticated by the face authentication processing, the processing section U3 displays the execution instruction screen (D3) that receives an execution instruction of the image processing to be performed by the image processing apparatus 200 on the display section 206. When the user US0 is not authenticated by the face authentication processing, the processing section U3 displays a different screen (D4 or D5) in accordance with the level of the coincidence rate C0 on the display section 206. According to the seventh aspect, it is possible to provide the information processing apparatus (100) that improves the convenience of the user US0 who uses the image processing apparatus 200.

Eighth Aspect

Also, as exemplified in FIG. 2 and FIG. 11, a control program PR1 according to an aspect of the present technology is the control program PR1 for controlling the image processing apparatus 200 including the display section 206, and causes a computer to realize an acquisition function FU2 and a processing function FU3. The acquisition function FU2 acquires the coincidence rate C0 from the face authentication section U1 that performs face authentication processing based on the coincidence rate C0 between the face image (IM3) corresponding to the registered face data (DA2) and the captured image IM1 of the face FO of the user US0. When the user US0 is authenticated by the face authentication processing, the processing function FU3 displays the execution instruction screen (D3) that receives the execution instruction of the image processing performed by the image processing apparatus 200 on the display section 206. When the user US0 is not authenticated by the face authentication processing, the processing function FU3 displays a different screen (D4 or D5) that differs in accordance with the level of the coincidence rate C0 on the display section 206. According to the eighth aspect, it is possible to provide the control program PR1 that improves the convenience of the user US0 who uses the image processing apparatus 200.

Ninth Aspect

Further, as exemplified in FIG. 11, an image processing apparatus 200 according to an aspect of the present technology includes the display section 206, the acquisition section U2, and the processing section U3. The acquisition section U2 acquires the coincidence rate C0 from the face authentication section U1 that performs face authentication processing based on the coincidence rate C0 between the registered face image (IM3) corresponding to the registered face data (DA2) and the captured image IM1 of the face FO of the user US0. When the user US0 is authenticated by the face authentication processing, the processing section U3 displays the execution instruction screen (D3) that receives an execution instruction of the image processing on the display section 206. When the user US0 is not authenticated by the face authentication processing, the processing section U3 displays a different screen (D4 or D5) in accordance with the level of the coincidence rate C0 on the display section 206. According to the ninth aspect, it is possible to improve the convenience of the user US0 who uses the image processing apparatus 200.

Further, it is possible to apply the present technology to a complex system including the processing system SY1, a complex apparatus including the information processing apparatus (100), an image processing system including the image processing apparatus 200, a processing method performed by the processing system SY1, an information processing method performed by the information processing apparatus (100), a processing method performed by the image processing apparatus 200, a control method of the image processing apparatus 200, a computer-readable storage medium storing the control program PR1, and the like. Any one of the apparatuses may be configured by a plurality of distributed parts.

2. SPECIFIC EXAMPLE OF THE CONFIGURATION OF PROCESSING SYSTEM

FIG. 1 schematically illustrates the configuration of a system including a processing system SY1 as a specific example. The system includes an authentication print server 100, an image processing apparatus 200, a face authentication server 400, an imaging device 500, and a terminal 600. Here, the authentication print server 100 is an example of the information processing apparatus, and the face authentication server 400 is an example of the face authentication section U1. The processing system SY1 includes the authentication print server 100 and the image processing apparatus 200. In this regard, the processing system SY1 may include the terminal 600, the face authentication server 400, and the imaging device 500. The authentication print server 100, the image processing apparatus 200, the face authentication server 400, the imaging device 500, and the terminal 600 are connected to a network NE1 including the internet. The network NE1 may include a LAN. Here, a LAN is an abbreviation of local area network. The connection to the network NE1 may be in a wired manner, in a wireless manner, or may include connections both in a wired and a wireless manner.

The user US0 is able to register a print job J0 in the authentication print server 100 by using the terminal 600 including a CPU, a ROM, a RAM, a storage section, an I/F for connecting to the network NE1, and the like. Here, a CPU is an abbreviation of central processing unit, a ROM is an abbreviation of read only memory, and RAM is an abbreviation of random access memory, and I/F is an abbreviation of interface. The terminal 600 includes a computer such as a personal computer including a tablet terminal, a mobile phone such as a smartphone, or the like. When the user US0 who has registered a print job J0 on the authentication print server 100 succeeds in face authentication by holding the face FO up to the imaging device 500, it is possible for the user US0 to cause the image processing apparatus 200 to perform printing based on the print job J0 registered in the authentication print server 100. Also, it is possible for the authenticated user US0 to cause the image processing apparatus 200 to perform image processing such as copying, facsimile communication, reading a document and the like. In this regard, a combination of the image processing apparatus 200 and the imaging device 500 is not limited to one in the processing system SY1, and two or more combinations may exist in the processing system SY1. Also, there may be two or more terminals 600 in the processing system SY1.

The authentication print server 100 is a server computer including the acquisition section U2 that acquires a coincidence rate C0 described later, and the like, and the processing section U3 that causes the image processing apparatus 200 to perform image processing. The acquisition section U2 is able to acquire a print job registration request RE1 from the terminal 600 and a coincidence rate C0 and authentication success information IN3 from the face authentication server 400. When the processing section U3 receives a print job registration request RE1 from the terminal 600, the processing section U3 generates a print job J0 in accordance with a print job registration request RE1, associates the print job J0 with the user US0, and stores the print job J0. Also, as exemplified in FIG. 7 and FIG. 9, the processing section U3 keeps screen information DO for displaying a screen, such as a pre-login screen D1, a face authenticating screen D2, a function list screen D3, an imaging guidance screen D4, a user registration screen D5, or the like on the display section 206 of the image processing apparatus 200. The processing section U3 is able to transmit screen information DO in accordance with a scene to the image processing apparatus 200, and to transmit a print job J0 associated with the user US0 to the image processing apparatus 200. When the user US0 is authenticated by the face authentication processing, the processing section U3 displays a function list screen D3 on the display section 206 of the image processing apparatus 200. The function list screen D3 is an example of the execution instruction screen that receives an execution instruction of the image processing to be performed by the image processing apparatus 200.

The image processing apparatus 200 includes an input section 205, a display section 206, a print section 208, an I/F 210 of a card reader, and the like. As exemplified in FIG. 3, the image processing apparatus 200 may be a complex machine or a dedicated printer, a dedicated scanner, a dedicated copy machine, a dedicated facsimile machine, or the like. A complex machine refers to a printer having a function other than a print function. The functions other than a print function include a document read function, a copy function, a facsimile function, and the like. When the image processing apparatus 200 receives screen information DO from the authentication print server 100 via the network NE1, the image processing apparatus 200 displays a screen in accordance with the screen information DO on the display section 206. Also, when the image processing apparatus 200 receives a print job J0 from the authentication print server 100 via the network NE1, the image processing apparatus 200 causes the print section 208 to perform printing in accordance with the print job J0. In this regard, the image processing apparatus 200 may acquire the authentication information for authenticating the user US0 from the card reader, and may transmit the acquired authentication information to the authentication print server 100. Also, the image processing apparatus 200 may receive an input operation of a user name and a password by the input section 205, and may transmit the input user name and password to the authentication print server 100 as authentication information.

The face authentication server 400 is a server computer including a CPU, a ROM, a RAM, a storage section, an I/F connecting to the network NE1, and the like. The storage section of the face authentication server 400 stores a face database DB2 in which the registered face data DA2 based on the original face image IM2 of the user US0 is stored in association with the user US0. Here, it is assumed that an original face image IM2 is a captured image obtained by capturing the image of the face FO of the user US0 by the imaging device 500, or the like for performing user registration, and may be a moving image. Registered face data DA2 is the face data indicating the feature parts extracted from the original face image IM2 and is the face data registered in the face database DB2. The face authentication server 400 receives a captured image IM1 from the imaging device 500 via the network NE1 and generates captured face data DA1 for calculating a coincidence rate C0 from a captured image IM1. Captured face data DA1 is face data indicating feature parts extracted from a captured image IM1, and may be a moving image. A description will be given later of the face authentication processing performed by the face authentication server 400.

The imaging device 500 illustrated in FIG. 1 is a network camera having a function of a web server and an I/F for coupling to a CPU, a ROM, a RAM, a storage section, an imaging section, a network NE1, and the like. Accordingly, the imaging device 500 may be referred to as a server computer. When the imaging device 500 captures the face of the user US0 in a non-contact manner, the imaging device 500 transmits the captured image IM1 to the face authentication server 400 via the network NE1. In this regard, the imaging device 500 may not be a network camera and may be directly coupled to the face authentication server 400.

FIG. 2 schematically illustrates an example of the configuration of the authentication print server 100, which is an example of the information processing apparatus. The authentication print server 100 includes a CPU 101, which is a processor, a ROM 102, which is a semiconductor memory, a RAM 103, which is a semiconductor memory, a storage section 104, an input device 105, a display device 106, a network I/F 107, a clock circuit 108, and the like. These components are electrically coupled with each other so as to be able to mutually input and output information.

The storage section 104 stores an OS not illustrated in the figure, a control program PR1, screen information DO, a print job J0, and the like. Here, an OS is an abbreviation of an operating system. The storage section 104 is a computer readable medium storing the control program PR1. The control program PR1 may be recorded in an external computer-readable recording medium. The control program PR1 causes the authentication print server 100, as a computer, to realize the acquisition function FU2 of the coincidence rate C0, and the like, and the processing function FU3 for causing the image processing apparatus 200 to perform the image processing. The acquisition function FU2 and the network I/F 107 constitute the acquisition section U2 illustrated in FIG. 1. The processing function FU3 corresponds to the processing section U3. A print job J0 is stored in the storage section 104 in association with the user US0. In the example illustrated in FIG. 2, a print job "J1" in association with a user "US1", a print job "J2" in association with a user "US2", and a print job "J3" in association with a user "US3" are stored in the storage section 104. For the storage section 104, it is possible to use a magnetic storage device, such as a hard disk, a nonvolatile semiconductor memory such as a flash memory, and the like.

For the input device 105, it is possible to use a pointing device, a hard key including a keyboard, a touch panel attached to the front face of a display panel, or the like. It is possible to use a liquid crystal display panel or the like for the display device 106. The network I/F 107 is connected to the network NE1 and performs communication with a destination device connected to the network NE1 in accordance with a predetermined communication standard. For example, the network I/F 107 receives a print job registration request RE1, a coincidence rate C0, and authentication success information IN3, or the like from the destination device, and transmits screen information DO, a print job J0, and the like to the image processing apparatus 200, which is the destination device. The time circuit 108 is able to output the current date and time.

The CPU 101 executes the control program PR1, which has been read from the storage section 104 to the RAM 103 so as to perform the acquisition processing corresponding to the acquisition function FU2 and the control processing corresponding to the processing function FU3. The control program PR1 causes the authentication print server 100, which is a computer, to function as the acquisition section U2 and the processing section U3. The authentication print server 100, which executes the control program PR1, performs an acquisition step corresponding to the acquisition function FU2 and a control step corresponding to the processing function FU3.

Figure 3:
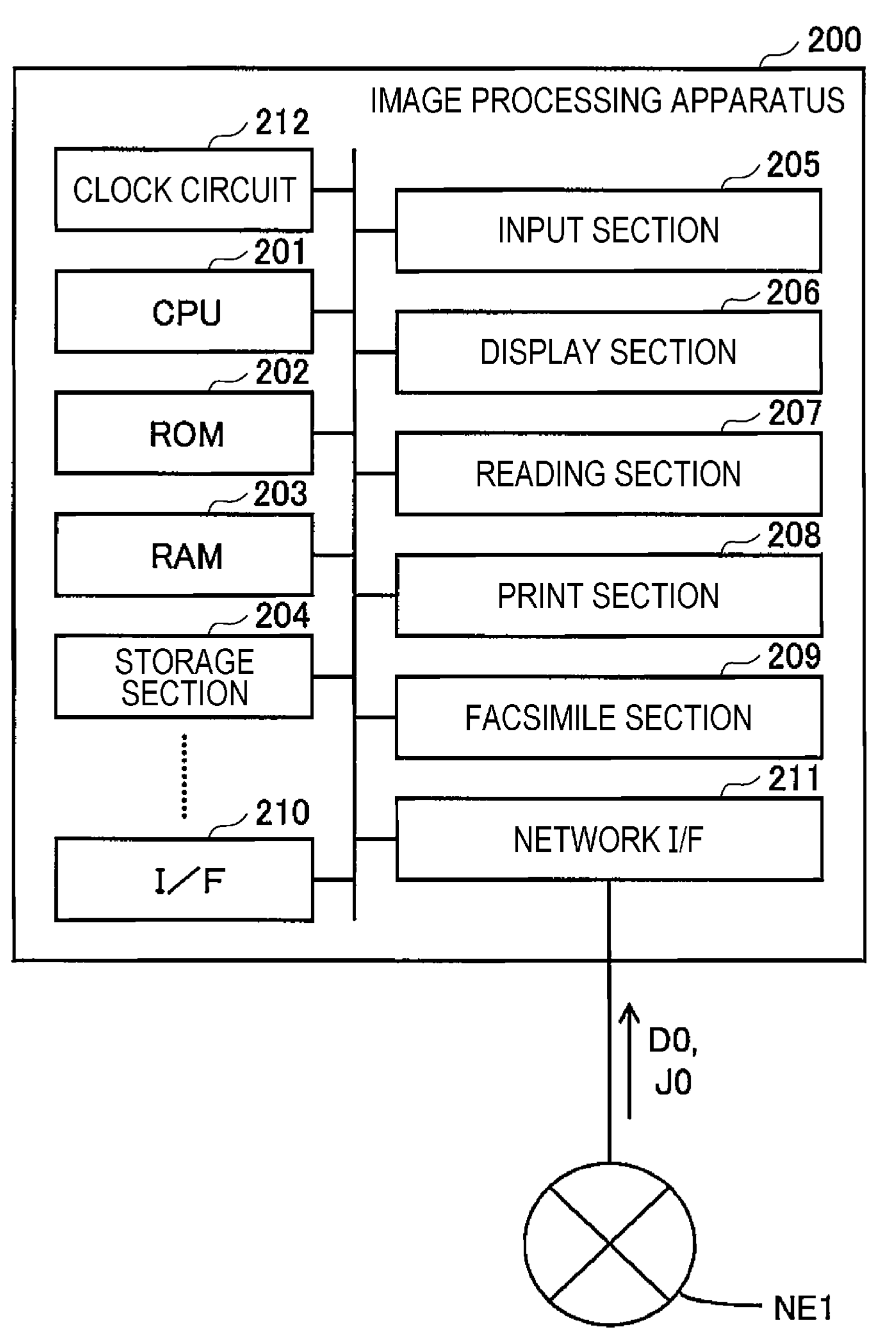
FIG. 3 is a block diagram schematically illustrating an example of the configuration of an image processing apparatus.

FIG. 3 schematically illustrates an example of the configuration of the image processing apparatus 200. The image processing apparatus 200 includes, a CPU 201, which is a processor, a ROM 202, which is a semiconductor memory, a RAM 203, which is a semiconductor memory, a storage section 204, the input section 205, a display section 206, a reading section 207, a print section 208, a facsimile section 209, a card reader I/F 210, a network I/F 211, a clock circuit 212, and the like. These components are electrically coupled with each other so as to be able to mutually input and output information.

The storage section 204 stores firmware or the like. The CPU 201 executes the firmware, which has been read from the storage section 204 to the RAM 203 so as to cause the image processing apparatus 200 to realize a plurality of functions as the image processing apparatus 200. These functions include a print function, a read function, a copy function, a facsimile function, and the like. For the storage section 204, it is possible to use a nonvolatile semiconductor memory such as a flash memory, a magnetic storage device such as a hard disk, or the like.

For the input section 205, it is possible to use a touch panel attached to the front face of a display panel, a hard key, or the like. It is possible to use a liquid crystal display panel or the like for the display section 206. The reading section 207 reads a document and generates scan data indicating a read image. The print section 208 performs printing on print paper based on a print job J0. The image processing apparatus 200 reads a document by using the reading section 207 and prints the read image by using the print section 208 so as to perform a copy function. The facsimile section 209 performs facsimile transmission of an image read by the reading section 207 via a telephone line and performs facsimile reception of an image from a transmission source via a telephone line. The image processing apparatus 200 is able to print the image received by the facsimile section 209 by using the print section 208. The network I/F 211 is connected to the network NE1, and performs communication with the authentication print server 100 connected to the network NE1 in accordance with a predetermined communication standard. For example, the network I/F 211 receives screen information DO, a print job J0, and the like from the authentication print server 100. The time circuit 212 is able to output the current date and time.

3. SPECIFIC EXAMPLE OF PROCESSING PERFORMED BY FACE AUTHENTICATION SECTION

Figure 4:
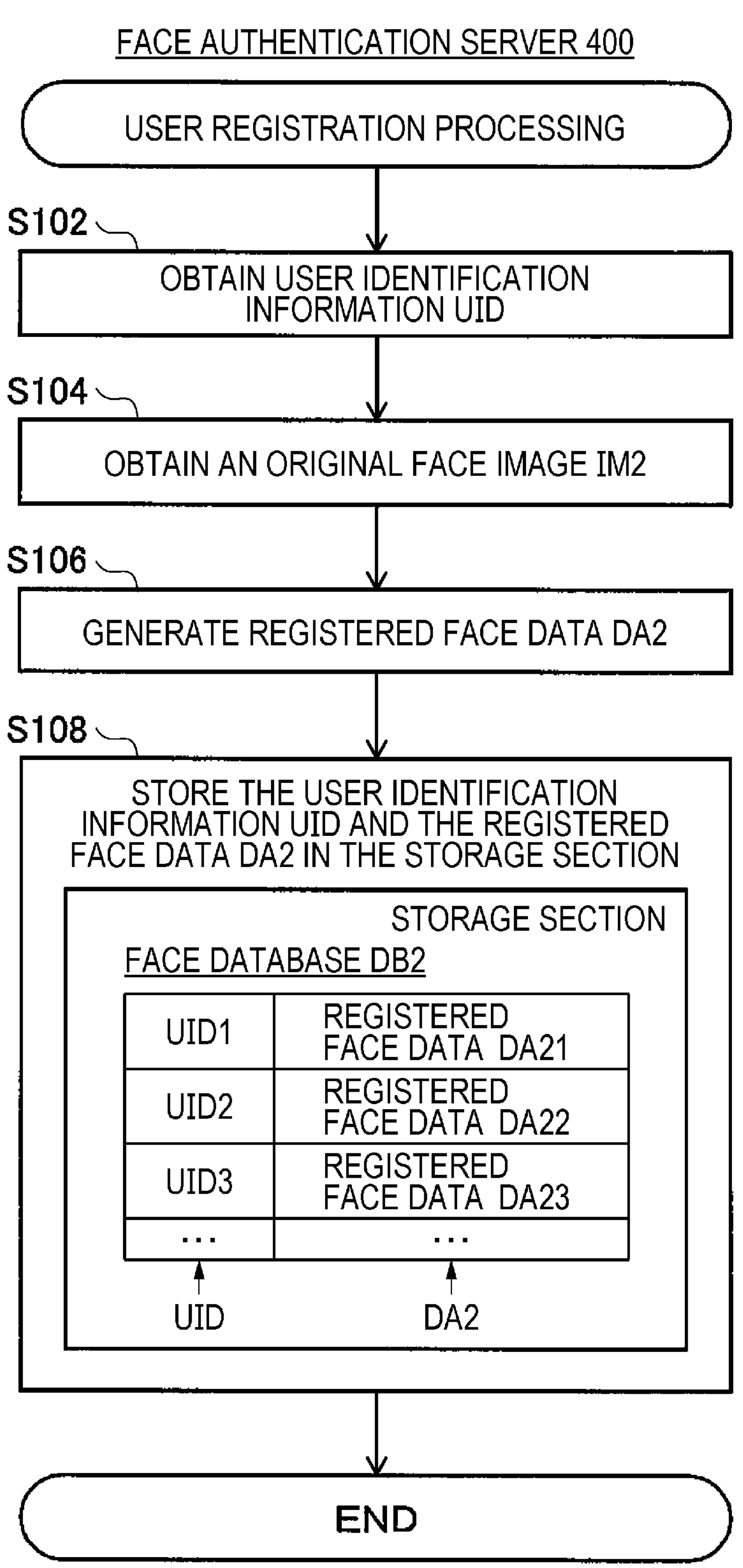
FIG. 4 is a flowchart schematically illustrating an example of user registration processing performed by a face authentication section.
Figure 5:
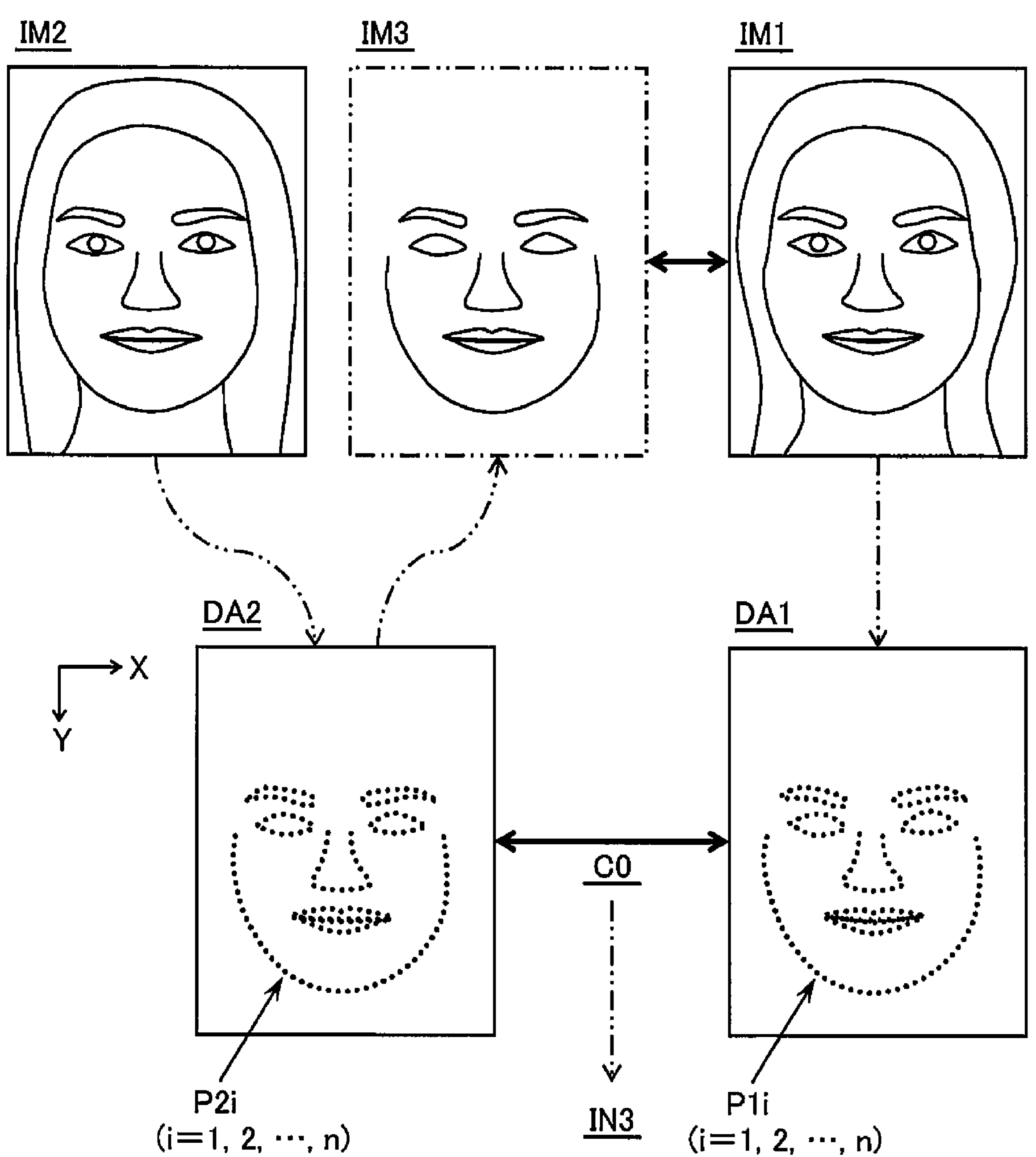
FIG. 5 is a diagram schematically illustrating an example of calculating the coincidence rate between a registered face image and a captured image.

FIG. 4 schematically illustrates an example of user registration processing performed by the face authentication server 400, which is an example of the face authentication section U1. FIG. 5 schematically illustrates an example of a state in which a coincidence rate C0 between the registered face image IM3 corresponding to registered face data DA2 and the captured image IM1 of the face FO of the user US0 is calculated. Here, a registered face image IM3 refers to a face image reproduced from registered face data DA2 and sometimes differs from an original face image IM2 as illustrated in FIG. 5. The face authentication server 400 performs the processing of steps S102 to S108 illustrated in FIG. 4 so as to store registered face data DA2 in the storage section in association with user identification information UID. Hereinafter the description of "step" will be abbreviated, and the code of a step is sometimes indicated in parentheses.

When the face authentication server 400 receives the operation to start the user registration processing, the face authentication server 400 starts the user registration processing illustrated in FIG. 4. For example, when the face authentication server 400 displays a user-registration start screen that receives an operation to start user registration processing on the terminal 600 via the network NE1, the face authentication server 400 is able to receive an operation to start the user registration processing from a user US0 via the terminal 600. Also, the face authentication server 400 may display a user-registration start screen that receives an operation to start the user registration processing on the display section 206 of the image processing apparatus 200 via the authentication print server 100. In this case, the face authentication server 400 is able to receive the operation to start the user registration processing from the user US0 via the image processing apparatus 200 and the authentication print server 100.

When the user registration processing is started, the face authentication server 400 obtains user identification information UID identifying a user US0 (S102). For example, when the face authentication server 400 displays an identification-information input screen that receives an input operation of a user name and a password on the terminal 600 via the network NE1, the face authentication server 400 is able to receive an input operation of a user name and a password from the user US0 via the terminal 600 as user identification information UID. Also, the face authentication server 400 may display an identification-information input screen on the display section 206 of the image processing apparatus 200 via the authentication print server 100. In this case, the face authentication server 400 is able to receive a user name and a password from the user US0 via the image processing apparatus 200 and the authentication print server 100 as user identification information UID. Further, the image processing apparatus 200 obtains authentication information from the card reader as the user identification information UID and transmits the authentication information to the authentication print server 100 so that the face authentication server 400 may receive the user identification information UID from the authentication print server 100.

After obtaining user identification information UID, the face authentication server 400 obtains an original face image IM2 of a user US0 (S104). For example, the face authentication server 400 causes the imaging device 500 to capture the image of the face FO of a user US0 via the network NE1 immediately after performing the processing of S102 so that the face authentication server 400 is able to receive an original face image IM2 from the imaging device 500 via the network NE1. Also, the face authentication server 400 may cause the terminal 600 to capture the image of the face FO of the user US0 via the network NE1 immediately after the processing of S102 so as to receive an original face image IM2 from the terminal 600 via the network NE1.

After obtaining an original face image IM2, the face authentication server 400 generates registered face data DA2 based on the original face image IM2 (S106). FIG. 5 illustrates an example of generating registered face data DA2 from the original face image IM2. The face authentication server 400 detects a face part from the original face image IM2, extracts feature parts such as a part of the face contour, a mouth, a nose, a left eye, a right eye, and the like from the face part, and generates registered face data DA2 indicating these feature parts by the coordinates of a predetermined number n of feature point P2*i*. Here, a predetermined number n is an integer larger than the number of the feature parts. The variable i is a variable identifying a feature point, and is an integer from 1 to n. It is possible to express the coordinates of the feature point P2*i* by, for example, an X-coordinate in the lateral direction and a Y-coordinate in the vertical direction. The number of the feature point P2*i* of each feature part is determined in advance and is not particularly limited, and is able to be, for example, about 5 to 100. It is possible to detect a face part, for example, by a method of distinguishing a face from the other parts of the original face image IM2 with a support vector machine. Also, it is possible to detect a face part by a method of distinguishing a face from the other parts by using a deep neural network, a general learning vector quantization method, or the like. It is possible to extract feature parts, for example, by using a method in which the positional relationships of the feature parts and predetermined characteristics in the vicinity of the feature parts are calculated as feature quantities, and used as feature vectors. Here, the predetermined features include a shade of color, a color distribution, and the like. Of course, it is possible to detect the feature parts by another method.

After performing the processing of S106 illustrated in FIG. 4, the face authentication server 400 stores registered face data DA2 in the face database DB2 in association with the user identification information UID, stores the face database DB2 in the storage section (S108), and ends the user registration processing. In the example illustrated in FIG. 4, registered face data "DA21" in accordance with user identification information "UID1", registered face data "DA22" in association with user identification information "UID2", and registered face data "DA23" in association with user identification information "UID3" are stored in the storage section 104. In this regard, it is assumed that the user identification information of the user "US1" illustrated in FIG. 2 is "UID1", the user identification information of the user "US2" illustrated in FIG. 2 is "UID2", and the user identification information of the user "US3" illustrated in FIG. 2 is "UID3".

The face authentication server 400 obtains a captured image IM1 from the imaging device 500, generates captured face data DA1 based on the captured image IM1, and calculates the coincidence rate C0 between the registered face image IM3 and the captured image IM1 based on the registered face data DA2 and the captured face data DA1. In this regard, a coincidence rate is also referred to as a degree of similarity. FIG. 5 illustrates an example in which captured face data DA1 is generated from a captured image IM1. The face authentication server 400 detects a face part from the captured image IM1, extracts feature parts, such as a part of a face contour, a mouth, a nose, a left eye, a right eye, and the like from the face part, and generates captured face data DA1 indicating these feature parts by the coordinates of the feature point P1*i* of the predetermined number n described above. It is possible to express the coordinates of the feature point P2*i* by, for example, an X-coordinate in the lateral direction and a Y-coordinate in the vertical direction. The feature point P1*i* correspond to the respective feature point P2*i*, and the number of feature point P1*i* of each feature part is the same as the number of feature point P2*i* of a corresponding feature part. For the method of detecting the face parts from the captured image IM1, it is possible to use the method of detecting face parts from the original face image IM2. For the method of extracting feature parts from the face parts based on the captured image IM1, it is possible to use the method of extracting feature parts from the face parts based on the original face image IM2.

Here, it is assumed that the coordinates of the feature point P1*i* are (X1i, Y1i), the coordinates of the feature point P2*i* are (X2i, Y2i), and the Euclidean distance between the feature point P1*i* and the feature point P2*i* is Li. The Euclidean distance Li is expressed by the following expression.

$$Li = \sqrt{(X2i - X1i)^2 + (Y2i - Y1i)^2} \tag{1}$$

The face authentication server 400 performs alignment processing for aligning the captured face data DA1 with the positions of the registered face data DA2, for example, such that the sum of squares of the Euclidean distance Li is minimized. Assuming that the sum of squares of the Euclidean distance Li is S, the sum of squares S is expressed by the following expression.

$$S = \sum_{i=1}^{n} \{(X2i - X1i)^2 + (Y2i - Y1i)^2\} \tag{2}$$

Also, the face authentication server 400 may perform alignment processing such that the sum total of the Euclidean distance Li is minimized.

For the alignment processing, it is possible to perform at least one processing out of move processing that translates the captured face data DA1, variable magnification processing that enlarges or reduces the captured face data DA1, and rotation processing that rotates the captured face data DA1. Here, it is assumed that a reference feature point out of a plurality of feature point P2*i* is P2*r*, and a reference feature point out of a plurality of feature point P1*i* is P1*r*. The face authentication server 400 may translate the captured face data DA1 such that the feature point P1*r* matches the feature point P2*r*, and may perform at least one of the variable magnification processing and the rotation processing so as to perform the alignment processing of the captured face data DA1.

The face authentication server 400 calculates the coincidence rate C0, for example, from the average value of the Euclidean distance Li after the alignment processing. For example, assuming that the arithmetic mean value is A, the average value A of the Euclidean distance Li is expressed by the following expression.

$$A = \frac{1}{n} \sum_{i=1}^{n} Li \tag{3}$$

Also, the face authentication server 400 may calculate a coincidence rate C0 from the square mean value of the Euclidean distance Li after the alignment processing.

The coincidence rate C0 is calculated, for example, so as to become larger as the average value A becomes smaller. Assuming that a positive coefficient to multiply the average value A is K, the coincidence rate C0 is expressed, for example, by the following expression.

$$C0 = 100 - K \times A \tag{4}$$

The maximum value of the coincidence rate C0 calculated by the expression (4) is 100. The face FO of the user US0 becomes closer to the registered face image IM3 as the coincidence rate C0 becomes larger, and the face FO of the user US0 becomes farther from the registered face image IM3 as the coincidence rate C0 becomes smaller. Of course, the method of obtaining a coincidence rate C0 is not limited to the method of calculating in accordance with the expression (4). A method of calculating a coincidence rate C0 in accordance with an expression different from the expression (4), a method of introducing a score as a coincidence rate C0 to be calculated by a recognition section using AI based on the registered face data DA2 and the captured face data DA1, or the like may be used. Here, AI refers to an abbreviation of artificial intelligence.

The face authentication server 400 determines whether or not to authenticate the user US0 based on the calculated coincidence rate C0. For example, it is assumed that a threshold value to determine whether or not the coincidence rate C0 is a high level is TH. When the coincidence rate C0 is equal to or higher than the threshold value TH, the face authentication server 400 generates authentication success information IN3 indicating that the user US0 has been authenticated, and transmits the authentication success information IN3 including information identifying a user US0 to the authentication print server 100 with the coincidence rate C0. Also, when the coincidence rate C0 is less than the threshold value TH, the face authentication server 400 does not generate authentication success information IN3, and transmits the coincidence rate C0 to the authentication server 400 without transmitting the authentication success information IN3. Of course, when the coincidence rate C0 is less than the threshold value TH, the face authentication server 400 may generate authentication failure information indicating that the user US0 has not been authenticated, and transmit authentication failure information including information indicating the registered user whose coincidence rate C0 has been calculated as a candidate to the authentication print server 100 with the coincidence rate C0. As described above, the face authentication server 400 performs face authentication processing based on the coincidence rate C0 between the registered face image IM3 corresponding to the registered face data DA2 and the captured image IM1 of the face FO of the user US0.

4. SPECIFIC EXAMPLE OF PROCESSING PERFORMED BY SYSTEM

Figure 7:
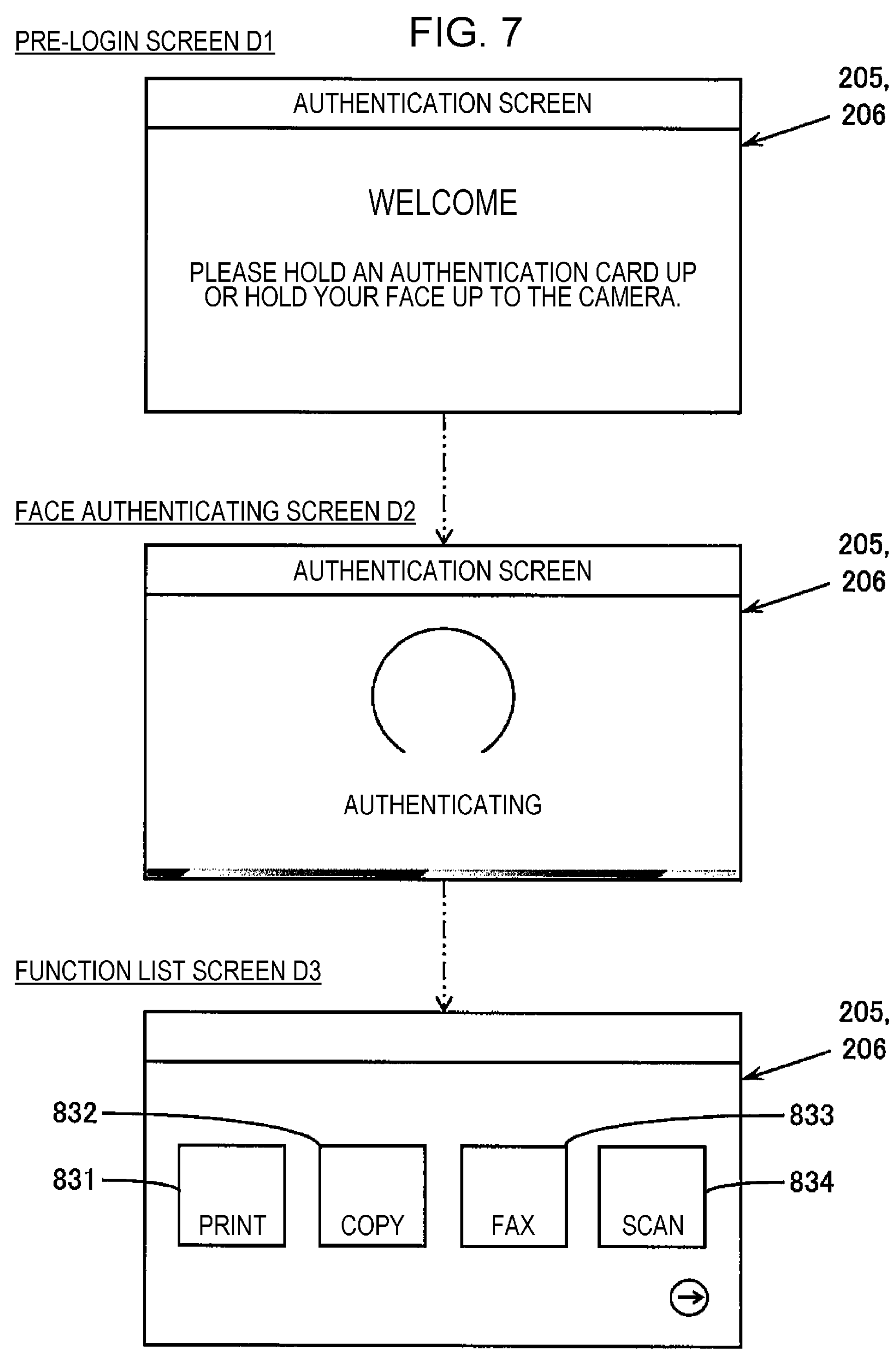
FIG. 7 is a diagram schematically illustrating an example of a screen displayed on a display section when a user is authenticated by the face authentication processing.

FIG. 6 schematically illustrates an example of the flow of the processing performed by the processing system SY1 when the user US0 is authenticated by the face authentication processing. Here, steps S202, S212, S220, and S226 correspond to the acquisition section U2 and the acquisition function FU2. Steps S204, S206, S214, S222, and S228 correspond to the processing section U3 and the processing function FU3. Hereinafter the code of a step is sometimes indicated in parentheses. FIG. 7 schematically illustrates an example of the screens displayed on the display section 206 of the image processing apparatus 200 when the user US0 is authenticated by the face authentication processing.

First, the terminal 600 receives an operation to register a print job J0 from a user US0, and transmits a registration request of the print job J0, that is to say, a print job registration request RE1 illustrated in FIG. 1 to the authentication print server 100 (S202). When the authentication print server 100 receives the print job registration request RE1 from the terminal 600, the authentication print server 100 generates a print job J0 based on the print job registration request RE1, and performs storage processing that stores the print job J0 in the storage section 104 in association with the user US0 (S204).

Also, when the user US0 has not logged in, the authentication print server 100 transmits pre-login screen information that causes to display a pre-login screen D1 illustrated in FIG. 7 on the display section 206 to the image processing apparatus 200 (S206). When the image processing apparatus 200 receives pre-login screen information from the authentication print server 100, the image processing apparatus 200 performs display processing that displays the pre-login screen D1 on the display section 206 (S208). The pre-login screen D1 illustrated in FIG. 7 has the contents prompting the user US0 to perform face authentication or card authentication. As a reference, when the pre-login screen D1 is displayed on the display section 206, in a case in which the user US0 performs an operation of holding an ID card over a card reader, card authentication is performed. Here, ID is an abbreviation of identification.

When the imaging device 500 captures an image of the face FO of the user US0 who appears near the image processing apparatus 200 in a non-contact manner, the imaging device 500 transmits the captured image IM1 of the face FO of the user US0 to the face authentication server 400 (S210). When the face authentication server 400 receives the captured image IM1 from the imaging device 500, the face authentication server 400 transmits face authenticating notification that notifies the start of the face authentication processing to the authentication print server 100 (S212). When the authentication print server 100 receives the face authenticating notification from the face authentication server 400, the authentication print server 100 transmits face authenticating screen information that causes to display the face authenticating screen D2 as illustrated in FIG. 7 on the display section 206 to the image processing apparatus 200 (S214). When the image processing apparatus 200 receives the face authenticating screen information from the authentication print server 100, the image processing apparatus 200 performs display processing that displays the face authenticating screen D2 on the display section 206 (S216). The face authenticating screen D2 illustrated in FIG. 7 indicates that the face authentication processing is in the middle of being performed.

Also, the face authentication server 400 performs the face authentication processing based on the registered face data DA2 and the captured image IM1 (S218). As described above, the face authentication server 400 calculates a coincidence rate C0 between the registered face image IM3 corresponding to the registered face data DA2 and the captured image IM1 based on the registered face data DA2 and the captured image IM1. When the coincidence rate C0 is equal to or higher than the threshold value TH, the face authentication server 400 generates authentication success information IN3 including information identifying the user US0, and transmits the authentication success information IN3 to the authentication print server 100 with the coincidence rate C0 (S220). When the authentication print server 100 obtains the authentication success information IN3 including the information identifying the user US0 from the face authentication server 400, the authentication print server 100 permits a login of the user US0, and transmits function list screen information that displays the function list screen D3 illustrated in FIG. 7 on the display section 206 to the image processing apparatus 200 (S222). When the image processing apparatus 200 receives the function list screen information from the authentication print server 100, the image processing apparatus 200 performs display processing that displays the function list screen D3 on the display section 206 provided with the input section 205 on the front face (S224). As described above, when the user US0 is authenticated by the face authentication processing, the authentication print server 100 displays the function list screen D3 that receives an execution instruction of the image processing to be performed by the image processing apparatus 200 on the display section 206.

The function list screen D3 illustrated in FIG. 7 includes a print button 831 to use a print function, a copy button 832 to use a copy function, a fax button 833 to use a facsimile function, a scan button 834 to use a read function, and the like. The user US0 is able to use various functions of the image processing apparatus 200 by performing a contact operation on the function list screen D3. When the user US0 performs a contact operation on the print button 831, the image processing apparatus 200 transmits a print instruction of the print job J0 associated with the user US0 to the authentication print server 100 (S226). When the authentication print server 100 receives a print instruction from the image processing apparatus 200, the authentication print server 100 generates print data for executing print based on the print job J0 associated with the user US0 identified by the authentication success information IN3, and transmits the print data to the image processing apparatus 200 (S228). When the image processing apparatus 200 receives print data from the authentication print server 100, the image processing apparatus 200 performs print processing in accordance with the print data (S230). Thereby, printing based on the print job J0 is performed. For example, when the user "US2" registers a print job "J2" illustrated in FIG. 2 in the authentication print server 100 and holds the face FO up to the imaging device 500, the coincidence rate C0 based on the registered face data DA22 associated with the user identification information UID2 illustrated in FIG. 4 and the captured image IM1 becomes highest. When the coincidence rate C0 is equal to or higher than the threshold value TH, the face authentication server 400 generates information identifying the user "US2", for example, the authentication success information IN3 including the user identification information UID2 and transmits the authentication success information IN3, and the like to the authentication print server 100. When the authentication print server 100 that has received the authentication success information IN3, and the like receives a print instruction from the image processing apparatus 200 in S226, the authentication print server 100 generates print data for executing print based on the print job "J2" associated with the user "US2" identified by the authentication success information IN3 and transmits the print data to the image processing apparatus 200. Also, when the user US0 performs a contact operation on the copy button 832, the image processing apparatus 200 performs processing for copying a document. When the user US0 performs a contact operation on the fax button 833, the image processing apparatus 200 performs facsimile communication. When the user US0 performs a contact operation on the scan button 834, the image processing apparatus 200 performs processing for reading a document. In this regard, when the user US0 performs a contact operation on a logout button not illustrated in the figure on the image processing apparatus 200, the user US0 is able to log out from the authentication print server 100.

When the coincidence rate C0 is less than the threshold value TH, the face authentication server 400 determines that the face authentication has failed and does not transmit the authentication success information IN3. By only displaying the contents informing that the face authentication has failed on the display section 206, the user US0 sometimes does not understand why the face authentication has failed and how to handle the situation. Thus, when the user US0 is not authenticated by the face authentication processing, the authentication print server 100 in this specific example displays a different screen in accordance with the level of the coincidence rate C0, for example, the imaging guidance screen D4 or the user registration screen D5 illustrated in FIG. 9 on the display section 206. Thereby, the user US0 is able to handle the face authentication failure in accordance with the imaging guidance screen D4 or the user registration screen D5.

FIG. 8 schematically illustrates an example of the processing performed by the processing section U3 when the acquisition section U2 acquires a coincidence rate C0. In FIG. 8, the components identical to the components illustrated in FIG. 6 are given the same codes as those in FIG. 6. When the coincidence rate C0 is equal to or higher than the threshold value TH described above, the acquisition section U2 acquires the coincidence rate C0 in S220 in FIG. 6, whereas when the coincidence rate C0 is less than the threshold value TH, the acquisition section U2 acquires the coincidence rate C0 at the time at which the face authentication server 400 has transmitted the coincidence rate to the authentication print server 100 immediately after S218. Here, steps S240, S242, S244, and S246 correspond to the processing section U3 and the processing function FU3. FIG. 9 schematically illustrates examples of screens displayed on the display section 206 in accordance with the level of the coincidence rate C0 when the user US0 is not authenticated by the face authentication processing. In the example illustrated in FIG. 8, the coincidence rate C0 is divided into a high level, a medium level, and a low level, and the processing section U3 displays a different screen in accordance with the level of the coincidence rate C0 on the display section 206. The high level indicates that the coincidence rate C0 is equal to or higher than the threshold value TH, and is the level by which the face authentication server 400 authenticates the user US0. For example, when the threshold value TH is 80, the high level refers to that the coincidence rate C0 is equal to or higher than 80 and less than or equal to 100. Of course, the threshold value TH may be higher than 80 or less than 80.

The level of the coincidence rate C0 when the user US0 is not authenticated by the face authentication processing includes a low level and a medium level higher than the low level and lower than a high level. Here, the low level is an example of the first level, and the medium level is an example of the second level. For example, it is assumed that the threshold value for determining whether or not the coincidence rate is equal to or higher than a medium level is TL. The threshold value TL is lower than the threshold value TH. The medium level indicates that the coincidence rate C0 is equal to or higher than the threshold value TL and less than threshold value TH, and the level at which the user US0 is permitted to capture his or her face FO again by the imaging device 500. The low level indicates that the coincidence rate C0 is less than the threshold value TL, and that the user registration may be performed. For example, when the threshold value TH is 80, and the threshold value TL is 60, the medium level indicates that the coincidence rate C0 is equal to or higher than 60 and less than 80, and the low level indicates that the coincidence rate C0 is less than 60. Of course, the threshold value TL may be higher than 60 or lower than 60.

When the face authentication server 400 calculates the coincidence rate C0 between the registered face image IM3 and the captured image IM1 in S218 illustrated in FIG. 6, the face authentication server 400 transmits the coincidence rate C0 to the authentication print server 100 regardless of whether or not authentication success information IN3 has been generated. When the face authentication server 400 does not transmit authentication success information IN3 including information identifying a user US0 to the authentication print server 100, the face authentication server 400 may transmit the information identifying a user US0 to the authentication print server 100 with the coincidence rate C0. When the authentication print server 100 receives a coincidence rate C0 from the face authentication server 400, the authentication print server 100 causes the processing to branch in accordance with whether or not the coincidence rate C0 is the high level (S240). When the coincidence rate C0 is equal to or higher than the threshold value TH, the face authentication server 400 is able to determine that the coincidence rate C0 is the high level, whereas when the coincidence rate C0 is less than the threshold value TH, the face authentication server 400 is able to determine that the coincidence rate C0 is not the high level. Also, when the face authentication server 400 obtains authentication success information IN3 in S220 illustrated in FIG. 6, the face authentication server 400 may determine that the coincidence rate C0 is the high level, whereas when the face authentication server 400 does not obtain authentication success information IN3, the face authentication server 400 may determine that the coincidence rate C0 is not the high level. When the face authentication server 400 determines that the coincidence rate C0 is the high level, the face authentication server 400 permits a login of the user US0, displays the function list screen D3 illustrated in FIG. 7 on the display section 206 (S222), and receives an execution instruction of the image processing to be performed by the image processing apparatus 200.

When the face authentication server 400 determines that the coincidence rate C0 is not the high level, the face authentication server 400 causes the processing to branch in accordance with whether or not the coincidence rate C0 is the medium level (S242). When the coincidence rate C0 is equal to or higher than the threshold value TL, the face authentication server 400 is able to determine that the coincidence rate C0 is the medium level, whereas when the coincidence rate C0 is less than the threshold value TL, the face authentication server 400 is able to determine that the coincidence rate C0 is the low level.

When the face authentication server 400 determines that the coincidence rate C0 is the medium level, the face authentication server 400 transmits the imaging guidance screen information that causes to display the imaging guidance screen D4 illustrated in FIG. 9 on the display section 206 to the image processing apparatus 200 (S244). When the image processing apparatus 200 receives imaging guidance screen information from the authentication print server 100, the image processing apparatus 200 performs display processing that displays the imaging guidance screen D4 on the display section 206 provided with the input section 205 on the front face. When the coincidence rate C0 is the medium level, the display on the display section 206 is changed from the face authenticating screen D2 to the imaging guidance screen D4. The imaging guidance screen D4 illustrated in FIG. 9 includes a display area stating "Authentication has failed. Please hold your face up to the camera once again." and an OK button 841. Accordingly, the imaging guidance screen D4 indicates that the user US0 has not been authenticated by the face authentication processing and the contents prompting imaging for the face authentication processing again. When the image processing apparatus 200 receives an operation on the OK button 841 from the user US0, the image processing apparatus 200 transmits confirmation notification to the authentication print server 100. When the authentication print server 100 receives the confirmation notification from the image processing apparatus 200, the authentication print server 100 ends the processing illustrated in FIG. 8.

The user US0 is able to understand that the user US0 ought to perform the operation of imaging the face FO again by viewing the imaging guidance screen D4. When the user US0 who has viewed the imaging guidance screen D4 holds the face FO up to the imaging device 500, the imaging device 500 captures the image of the face FO of the user US0 in S210 in FIG. 6, and transmits the captured image IM1 to the face authentication server 400. After that, the processing of S212 to S218 is performed, and when the coincidence rate C0 becomes the high level, the function list screen D3 illustrated in FIG. 7 is displayed on the display section 206, and an execution instruction of the image processing is received. When the coincidence rate C0 is lower than the high level but higher than the low level, the imaging guidance screen D4 is displayed on the display section 206, and thus the processing system SY1 according to the present embodiment is convenient.

When the face authentication server 400 determines that the coincidence rate C0 is the low level, the face authentication server 400 transmits the user registration screen information that displays the user registration screen D5 illustrated in FIG. 9 on the display section 206 to the image processing apparatus 200 (S246). When the image processing apparatus 200 receives user registration screen information from the authentication print server 100, the image processing apparatus 200 performs display processing that displays the user registration screen D5 on the display section 206 provided with the input section 205 on the front face. When the coincidence rate C0 is the low level, the display of the display section 206 changes from the face authenticating screen D2 to the user registration screen D5. The user registration screen D5 illustrated in FIG. 9 includes the display area stating "User is not registered. Please carry out user registration.", and the OK button 851. Accordingly, the user registration screen D5 indicates that the user US0 has not been authenticated by the face authentication processing, and the contents prompting the generation of the registered face data DA2 (refer to FIG. 4 and FIG. 5), which is based on the original face image IM2 of the user US0 to be associated with the user identification information UID. When the image processing apparatus 200 receives an operation on the OK button 851 from the user US0, the image processing apparatus 200 transmits confirmation notification to the authentication print server 100. When the authentication print server 100 receives the confirmation notification from the image processing apparatus 200, the authentication print server 100 ends the processing illustrated in FIG. 8.

The user US0 is able to understand that the user US0 ought to perform user registration by viewing the user registration screen D5. The user US0 who has viewed the user registration screen D5 is able to perform user registration by performing the operation to start the user registration processing illustrated in FIG. 4. The face authentication server 400 obtains user identification information UID and the original face image IM2 illustrated in FIG. 5 in accordance with the user registration processing, generates registered face data DA2 based on the original face image IM2, and stores the registered face data DA2 in the face database DB2 in association with the user identification information UID. When the user US0 holds the face FO up to the imaging device 500 again, the imaging device 500 captures the image of the face FO of the user US0 in S210 in FIG. 6, and transmits the captured image IM1 to the face authentication server 400. After that, the processing of S212 to S218 is performed, and when the coincidence rate C0 becomes the high level, the function list screen D3 illustrated in FIG. 7 is displayed on the display section 206, and an execution instruction of the image processing is received. When the coincidence rate C0 is the low level, which is lower than the medium level, the user registration screen D5 is displayed on the display section 206, and thus the processing system SY1 according to the present embodiment is convenient.

As described above, when the user US0 is not authenticated by the face authentication processing, not a uniform screen, but a different screen in accordance with the level of the coincidence rate C0 between the registered face image IM3 and the captured image IM1 is displayed on the display section 206 of the image processing apparatus 200. The user US0 is able to understand the level of the coincidence rate C0 between the registered face image IM3 and the captured image IM1 by viewing the screen of the display section 206, for example, the imaging guidance screen D4 or the user registration screen D5. Accordingly, in the present embodiment, it is possible to improve the convenience of the user US0 who uses the image processing apparatus 200.

5. VARIATIONS

Various variations of the present disclosure are considered. For example, when the coincidence rate C0 is the high level, the face authentication server 400 may transmit the coincidence rate C0 with the information identifying the user US0 to the authentication print server 100 without transmitting the authentication success information IN3 to the authentication print server 100. When the coincidence rate C0 is equal to or higher than the threshold value TH, which is the case when the user US0 has been authenticated by the face authentication processing, the authentication print server 100 ought to permit the login of the user US0 in a case in which the coincidence rate C0 is equal to or higher than the threshold value TH, and perform the processing for displaying the function list screen D3 on the display section 206. Also, the authentication print server 100 may include the face authentication section U1.

It is possible to suitably change the processing described above, such as replacing the order of the processing, or the like. For example, in the processing illustrated in FIG. 4, the face authentication server 400 may perform the processing of the user-identification information acquisition processing in S102 after the processing of S104 or S106. In the processing illustrated in FIG. 8, it is possible for the processing section U3 to perform the determination processing of S242 prior to the determination processing of S240. Also, the processing described above is not limited to the example performed by the CPU and may be performed by an electronic component, such as an ASIC, or the like. Here, ASIC is an abbreviation of an application specific integrated circuit. Also, the processing described above may be distributed processing performed by a plurality of CPUs or may be performed by the operation of the combination of a CPU with an electronic component such as ASIC, or the like.

As illustrated by the example in FIG. 10, when the coincidence rate C0 is repeatedly the medium level although the imaging device 500 repeats capturing the image of the face FO of the user US0, the authentication print server 100 may display the user registration screen D5 on the display section 206. FIG. 10 schematically illustrates an example of the other processing performed by the processing section U3 when the acquisition section U2 acquires the coincidence rate C0. In FIG. 10, the same element as the element illustrated in FIG. 8 is given the same sign as that in FIG. 8. In the processing illustrated in FIG. 10, S250 is added compared with the processing illustrated in FIG. 8.

When the coincidence rate C0 received from the face authentication server 400 is the medium level, the authentication print server 100 performs the processing of S240 and S242, and then proceeds to the processing of S250. In S250, the authentication print server 100 branches the processing depending on whether or not the obtained coincidence rate C0 is determined to be the medium level continuously for N times for the user to be processed. Here, N is an integer of 2 or more. To determine the number of continuous times of the medium level for the user to be processed, it is assumed that a point in time when the coincidence rate C0 of the medium level is obtained for the user to be processed after the coincidence rate C0 of a user different from the user to be processed is the starting point for counting the number of continuous times of the medium level. When the obtained coincidence rate C0 is the medium level continuously for N times for the user to be processed, the authentication print server 100 displays the user registration screen D5 illustrated in FIG. 9 on the display section 206 (S246). On the other hand, when the number of continuous times of the case in which the obtained coincidence rate C0 is the medium level for the user to be processed is less than N, the authentication print server 100 displays the imaging guidance screen D4 illustrated in FIG. 9 on the display section 206 (S244).

By the above, when the number of continuous times of the case in which the obtained coincidence rate C0 is the medium level for the user US0 is less than N, it is possible for the user US0 to understand that the user US0 ought to perform the operation to capture the image of the face FO again by viewing the imaging guidance screen D4. When the case in which the coincidence rate C0 calculated by the face authentication processing is the medium level is repeated, even though the level of the coincidence rate C0 is the medium level higher than the low level, the possibility of successful face authentication is low. When the number of continuous times of the case in which the coincidence rate C0 is the medium level for the user US0 is N, it is possible for the user US0 to understand that the user US0 ought to perform user registration by viewing the user registration screen D5.

By the above, it is possible for the example illustrated in FIG. 10 to further improve the convenience of the user US0 who uses the image processing apparatus 200.

As illustrated by the example in FIG. 11, the processing system SY1 does not include the authentication print server 100, and the acquisition section U2 and the processing section U3 may be included in the image processing apparatus 200. FIG. 11 schematically illustrates an example of another configuration of the system including the processing system SY1. The system includes the image processing apparatus 200, the face authentication server 400, the imaging device 500, and the terminal 600. The image processing apparatus 200 includes the acquisition section U2, the processing section U3, and the like. Accordingly, the processing system SY1 is included in the image processing apparatus 200. The acquisition section U2 including the network I/F 211 obtains a print job registration request RE1, a coincidence rate C0, authentication success information IN3, and the like. When the user US0 is authenticated by the face authentication processing, the processing section U3 permits a login of the user US0 and displays the function list screen D3 illustrated in FIG. 7 on the display section 206 of the image processing apparatus 200. Also, when the user US0 is not authenticated by the face authentication processing, the processing section U3 displays the imaging guidance screen D4 or the user registration screen D5 illustrated in FIG. 9 on the display section 206 in accordance with the level of the coincidence rate C0.

As described above, it is also possible for the example illustrated in FIG. 11 to improve the convenience of the user US0 who uses the image processing apparatus 200. The image processing apparatus 200 may include the face authentication section U1.

6. CONCLUSION

As described above, it is possible to provide technology that improves the convenience of the user US0 who uses the image processing apparatus 200, and the like according to various aspects of the present disclosure. Of course, by the technology including only constituent features according to the independent claims, it is possible to obtain the basic advantages described above. Also, it is possible to carry out the configuration in which each component disclosed in the embodiments described above is mutually replaced, combined, or changed, and the configuration in which publicly known technology and each component disclosed in the embodiments described above are mutually replaced, combined, or changed, and the like. The present disclosure also includes these configurations, and the like.

What is claimed is:

1. A processing system including an image processing apparatus provided with a display section, the processing system comprising:

a first central processing unit (CPU) that acquires, from a second CPU that performs face authentication processing based on a coincidence rate between a face image corresponding to registered first face data and a captured image of a face of a user, the coincidence rate;

in the face authentication processing, when the user is authenticated based on the acquired coincidence rate that is higher than or equal to a first level, controls the display section to display an execution instruction screen for receiving an execution instruction of image processing to be executed by the image processing apparatus;

in the face authentication processing, when the user is not authenticated based on determination that the acquired coincidence rate is less than the first level and greater than or equal to a second level, controls the display section to display an imaging guidance screen that prompts imaging of the user for performing the face authentication processing again; and in the face authentication processing, when the user is not authenticated based on determination that the acquired coincidence rate is less than the first level and is a third level that is less than the second level, controls the display section to display a registration guidance screen that prompts the user to register the first face data.

2. The processing system according to claim 1, wherein when the acquired coincidence rate of the user is the second level continuously for N times, the first CPU further controls the display section to display a user registration screen prompting generation of second face data, and N is an integer of two or higher.

3. The processing system according to claim 1, wherein the first CPU further controls the display section via a network.

4. The processing system according to claim 1, wherein the first CPU is included in the image processing apparatus.

5. An information processing apparatus connected to an image processing apparatus including a display section, the information processing apparatus comprising:

a first central processing unit (CPU) that acquires, from a second CPU that performs face authentication processing based on a coincidence rate between a face image corresponding to registered first face data and a captured image of a face of a user, the coincidence rate;

in the face authentication processing, when the user is authenticated based on the acquired coincidence rate that is higher than or equal to a first level, controls the display section to display an execution instruction screen for receiving an execution instruction of image processing to be executed by the image processing apparatus;

in the face authentication processing, when the user is not authenticated based on determination that the acquired coincidence rate is less than the first level and greater than or equal to a second level, controls the display section to display an imaging guidance screen that prompts imaging of the user for performing the face authentication processing again; and in the face authentication processing, when the user is not authenticated based on determination that the acquired coincidence rate is less than the first level and is a third level that is less than the second level, controls the display section to display a registration guidance screen that prompts the user to register the first face data.

6. A non-transitory computer-readable storage medium storing a control program for controlling an image processing apparatus including a display section, the control program for causing a computer to perform processing comprising:

an acquisition function that acquires, from a central processing unit (CPU) that performs face authentication processing based on a coincidence rate between a face image corresponding to registered first face data and a captured image of a face of a user, the coincidence rate; and a processing function that displays, when the user is authenticated by the face authentication processing based on the acquired coincidence rate that is higher than or equal to a first level, an execution instruction screen for receiving an execution instruction of image processing to be executed by the image processing apparatus on the display section;

displays, when the user is not authenticated by the face authentication processing based on determination that the acquired coincidence rate is less than the first level and greater than or equal to a second level, an imaging guidance screen that prompts imaging of the user for performing the face authentication processing again; and displays, when the user is not authenticated by the face authentication processing based on determination that the acquired coincidence rate is less than the first level and is a third level that is less than the second level, a registration guidance screen that prompts the user to register the first face data.

7. An image processing apparatus comprising:

a display section; and a first central processing unit (CPU) that acquires, from a second CPU that performs face authentication processing based on a coincidence rate between a face image corresponding to registered first face data and a captured image of a face of a user, the coincidence rate;

in the face authentication processing, when the user is authenticated based on the acquired coincidence rate that is higher than or equal to a first level, controls the display section to display an execution instruction screen for receiving an execution instruction of image processing;

in the face authentication processing, when the user is not authenticated based on determination that the acquired coincidence rate is less than the first level and greater than or equal to a second level, controls the display section to display an imaging guidance screen that prompts imaging of the user for performing the face authentication processing again; and in the face authentication processing, when the user is not authenticated based on determination that the acquired coincidence rate is less than the first level and is a third level that is less than the second level, controls the display section to display a registration guidance screen that prompts the user to register the first face data.

8. The processing system according to claim 2, wherein the user registration screen includes an input section on a front face of the display section.

* * * * *